United States Patent
Kwak et al.

(10) Patent No.: US 10,359,809 B2
(45) Date of Patent: Jul. 23, 2019

(54) ELECTRONIC DEVICE

(71) Applicant: Samsung Electronics Co., Ltd., Gyeonggi-do (KR)

(72) Inventors: Woon-Geun Kwak, Gyeonggi-do (KR); Jung-Sik Park, Gyeonggi-do (KR); Jae-Ouk Chung, Seoul (KR); Do-Hun Cha, Gyeonggi-do (KR); Kyung-Jung Kim, Gyeonggi-do (KR); Seung-Won Oh, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 145 days.

(21) Appl. No.: 15/086,286

(22) Filed: Mar. 31, 2016

(65) Prior Publication Data

US 2016/0291642 A1    Oct. 6, 2016

(30) Foreign Application Priority Data

Apr. 1, 2015    (KR) .......................... 10-2015-0046286

(51) Int. Cl.
*G06F 1/16* (2006.01)
*G06F 3/0488* (2013.01)
(Continued)

(52) U.S. Cl.
CPC .......... *G06F 1/1652* (2013.01); *G06F 1/1624* (2013.01); *G06F 1/1626* (2013.01);
(Continued)

(58) Field of Classification Search
CPC .... G06F 1/1626; G06F 1/1601; G06F 1/1618; G06F 1/1637; G06F 1/1616; G06F 1/1624; G06F 1/1647; G06F 1/1677; G06F 1/165; G06F 1/1656; G06F 1/1652; G06F 1/1641; G06F 2200/1633; G06F 2200/1634; G06F 3/04842; G06F 3/041; G06F 3/0416; G06F 3/0488; H01L 51/0097; H01L 2251/5338; H01L 27/3244; H01L 27/323;
(Continued)

(56) References Cited

U.S. PATENT DOCUMENTS

D580,432 S    11/2008 Yun et al.
7,899,505 B2 *    3/2011 Ozawa .................... G06F 1/162
                                                        361/679.02
(Continued)

FOREIGN PATENT DOCUMENTS

FR    2 929 435 A1    10/2009
KR    10-2014-0101295 A    8/2014

OTHER PUBLICATIONS

European Search Report, dated Sep. 13, 2016.

*Primary Examiner* — Dismery Mercedes
(74) *Attorney, Agent, or Firm* — Cha & Reiter, LLC

(57) ABSTRACT

An electronic device may include: a foldable body transitionable between an unfolded state and a folded state; a flexible display device disposed on a front face of the body, the flexible display being foldable together with the body; and a cover that enclosing at least a portion of a rear face of the body, the cover being foldable together with the body. The flexible display may include an exposed region that remains visible when the foldable body is in the folded state.

17 Claims, 21 Drawing Sheets

(51) Int. Cl.
*G06F 3/0482* (2013.01)
*H04M 1/02* (2006.01)
*G06F 3/0481* (2013.01)
*G06F 3/0484* (2013.01)

(52) U.S. Cl.
CPC .......... *G06F 1/1647* (2013.01); *G06F 1/1677* (2013.01); *G06F 3/04817* (2013.01); *G06F 3/04845* (2013.01); *G06F 3/04883* (2013.01); *G06F 3/04886* (2013.01); *H04M 1/0214* (2013.01); *H04M 1/0216* (2013.01); *H04M 1/0237* (2013.01); *H04M 1/0268* (2013.01)

(58) Field of Classification Search
CPC ........ G02F 2001/133342; G02F 2001/133305; H04M 1/0237; H04M 1/0268; H04M 1/0245; H04M 1/0239; H04M 1/0208; H04M 1/0266; H04M 1/0214; H04M 1/0247; H04M 1/0235; H04M 2250/16; H04M 2250/22
See application file for complete search history.

(56) References Cited

U.S. PATENT DOCUMENTS

| | | | | |
|---|---|---|---|---|
| 8,427,097 | B2* | 4/2013 | Planes | B60L 11/1887 307/46 |
| 8,787,016 | B2* | 7/2014 | Rothkopf | H04M 1/0216 361/679.55 |
| 9,164,547 | B1* | 10/2015 | Kwon | G06F 1/1656 |
| 9,173,288 | B1* | 10/2015 | Kim | G06F 1/1633 |
| 9,286,812 | B2* | 3/2016 | Bohn | G09F 9/301 |
| 9,348,362 | B2* | 5/2016 | Ko | G06F 1/1626 |
| 9,830,075 | B2* | 11/2017 | Kim | G06F 3/04817 |
| 9,933,819 | B2* | 4/2018 | Kim | G06F 1/1652 |
| 10,008,135 | B2* | 6/2018 | Lim | G09F 9/00 |
| 2006/0211457 | A1* | 9/2006 | Otsuka | G06F 1/162 455/575.1 |
| 2007/0270180 | A1* | 11/2007 | Takagi | H04M 1/0237 455/550.1 |
| 2008/0303782 | A1* | 12/2008 | Grant | G06F 1/1615 345/156 |
| 2010/0060548 | A1* | 3/2010 | Choi | G06F 3/0414 345/1.3 |
| 2010/0085274 | A1* | 4/2010 | Kilpatrick, II | G06F 1/1616 345/1.3 |
| 2011/0051327 | A1* | 3/2011 | Yang | G06F 1/162 361/679.01 |
| 2011/0241998 | A1* | 10/2011 | McKinney | G06F 1/1616 345/168 |
| 2012/0194448 | A1* | 8/2012 | Rothkopf | A45C 13/002 345/173 |
| 2012/0262367 | A1* | 10/2012 | Chiu | G06F 1/1626 345/156 |
| 2013/0010405 | A1* | 1/2013 | Rothkopf | H04M 1/0216 361/679.01 |
| 2014/0049464 | A1* | 2/2014 | Kwak | G06F 3/0487 345/156 |
| 2014/0204037 | A1* | 7/2014 | Kim | G06F 1/1647 345/173 |
| 2014/0210706 | A1* | 7/2014 | Park | G06F 3/0487 345/156 |
| 2014/0226275 | A1 | 8/2014 | Ko et al. | |
| 2014/0285476 | A1* | 9/2014 | Cho | G06F 1/1601 345/204 |
| 2014/0362513 | A1* | 12/2014 | Nurmi | G06F 1/1652 361/679.27 |
| 2015/0338888 | A1* | 11/2015 | Kim | G06F 1/1677 345/156 |
| 2016/0070305 | A1* | 3/2016 | Kim | G06F 1/1652 345/173 |
| 2016/0085319 | A1* | 3/2016 | Kim | G06F 3/0346 345/156 |
| 2017/0003793 | A1* | 1/2017 | Gao | G06F 3/0416 |
| 2017/0169741 | A1* | 6/2017 | Lim | G09F 9/00 |
| 2018/0164852 | A1* | 6/2018 | Lim | H04M 1/0214 |

* cited by examiner

ELECTRONIC DEVICE

CLAIM OF PRIORITY

This application claims the priority under 35 U.S.C. § 119(a) to Korean Application Serial No. 10-2015-0046286, which was filed in the Korean Intellectual Property Office on Apr. 1, 2015, the entire contents of which are hereby incorporated by reference.

TECHNICAL FIELD

The present disclosure relate to an electronic device, for example, a foldable electronic device.

BACKGROUND

An electronic device refers to a device that performs a specific function according to an equipped program or application installed on the device. The equipped program or application may include at least one of the following: an electronic scheduler, a portable multimedia reproducer, a mobile communication terminal, a tablet PC, an image/sound device, a desktop/laptop PC, or a vehicular navigation system, as well as a home appliance. The electronic device may output information stored therein, for example, as a sound or an image.

The degree of integration of the various functions of such electronic devices has increased as super-high speed and large capacity wireless communication has been popularized. In addition to a communication function, such electronic devices may have a variety of other functions, such as, for example, an entertainment function (e.g., a game function), a multimedia function (e.g., a music/video reproducing function), a communication and security function for mobile banking, a schedule management function, and an e-wallet function.

A portable electronic device, such as an electronic scheduler, a portable multimedia reproducer, a mobile communication terminal, or a tablet PC, may be equipped with a flat display device and a battery. Due to the shape of the display device or the battery, such a portable electronic device may have a corresponding shape, such as a bar-type external appearance, a folder-type external appearance, or a sliding-type external shape. Electronic devices are increasingly being equipped with larger sized screens to facilitate performing various functions, such as watching a video, more comfortably.

Carrying an electronic device that includes a relatively large screens may be inconvenient. An electronic device that includes a flexible display such that the electronic device is foldable can be folded to a smaller size and would be more conveniently carried.

SUMMARY

As the foldable electronic device becomes commercially available, attention is focused on how to use such a foldable electronic device more conveniently. For example, the convenience of use may be enhanced by allowing a user to make voice calls or to confirm whether a message is received through the electronic device even in a state where the electronic device is folded.

Various embodiments of the present disclosure are to provide an electronic device that is configured to be foldable such that the electronic device can be easily carried, and has an enlarged screen in an unfolded state as compared to a folded state.

Various embodiments of the present disclosure are to provide an electronic device that may output a screen through a first display in an unfolded state and through a second display in a folded state such that the electronic device can be used in various manners.

Various embodiments of the present disclosure are to provide an electronic device that can be conveniently used even in a folded state by using a portion of a display device that is relatively or partially movable on the electronic device at a folding operation.

According to various embodiments of the present disclosure, an electronic device may include: a foldable body transitionable between an unfolded state and a folded state; a flexible display device disposed on a front face of the body, the flexible display being foldable together with the body; and a cover that enclosing at least a portion of a rear face of the body. The cover may be foldable together with the body, and the flexible display may include an exposed region that remains visible when the foldable body is in the folded state.

In addition, according to various embodiments of the present disclosure, an electronic device may include: a foldable body being transitionable between a folded state and an unfolded state; and a flexible display device coupled to the body and being foldable together with the foldable body. When the foldable body is in folded state, at least a portion of the flexible display device includes an exposed region that remains visible.

An electronic device according to various embodiments of the present disclosure can be conveniently or comfortably used even if the body is not unfolded again by the user since text or image information can be output through a second display unit even in a state where the body is folded.

In addition, an electronic device according to various embodiments of the present disclosure can be conveniently used by the user even in a state where the electronic device is folded since at least a portion of the flexible display device is exposed to the outside of the body in a state where the flexible display device is folded so that a screen can be output or a touch input can be performed through the exposed region of the flexible display device.

These and other aspects of the present disclosure are more fully described hereinbelow.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
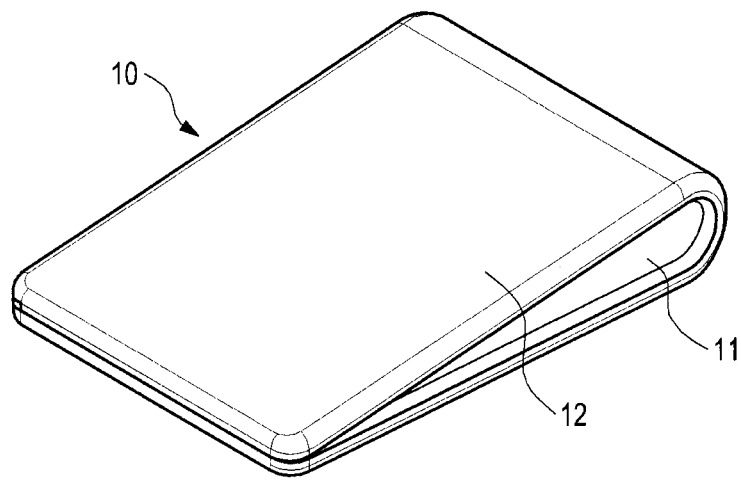
FIG. 1 is a perspective view illustrating a conventional foldable electronic device.

Hereinafter, various embodiments of the present disclosure will be described with reference to various embodiments of the present disclosure. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

FIG. 1 is a perspective view illustrating a conventional foldable electronic device. Referring to FIG. 1, a conventional foldable electronic device 10 may be implemented as a foldable portable terminal, and may include a display 11 that is concealed from the outside in the folded state. The display 11 may display an image. In the state where the electronic device is folded, the display 11 may be concealed by the electronic device 10.

The electronic device 10 may be provided with a cover 12 that is formed of a flexible material, such as a leather material or a rubber material, so that the sense of an exterior design can be diversified. The electronic device 10 may be configured to be foldable so that the electronic device 10 can be conveniently carried.

However, in order to use the electronic device 10, it is necessary to unfold the electronic device 10, which may be troublesome and inconvenient. Thus, the teachings of invention addresses the drawbacks of conventional foldable device, as explained hereinafter.

Figure 2:
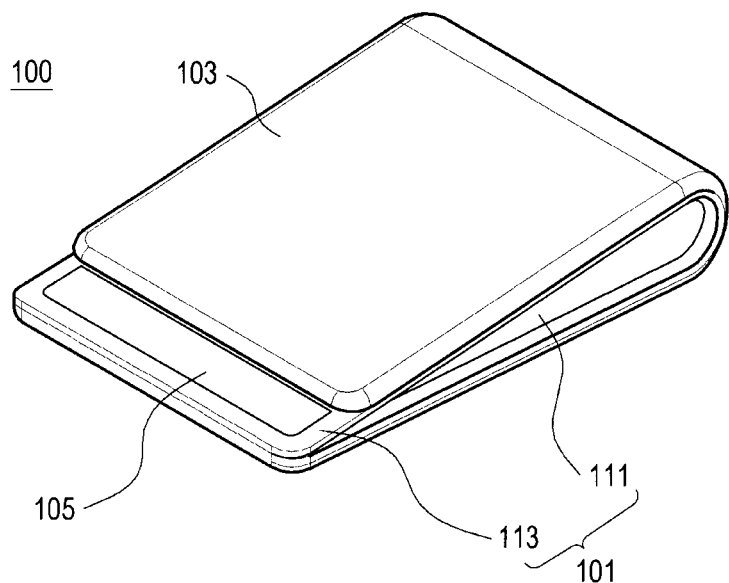
FIG. 2 is a perspective view illustrating an electronic device according to a first one of various embodiments of the present disclosure.
Figure 3:
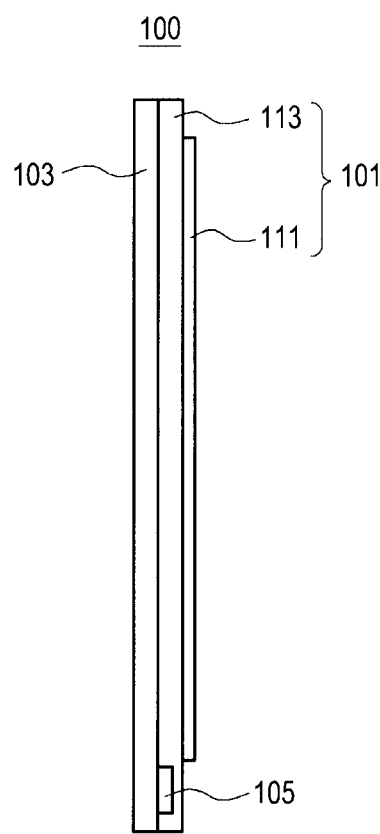
FIG. 3 is a cross-sectional view illustrating the electronic device according to the first one of various embodiments of the present disclosure.
Figure 4:
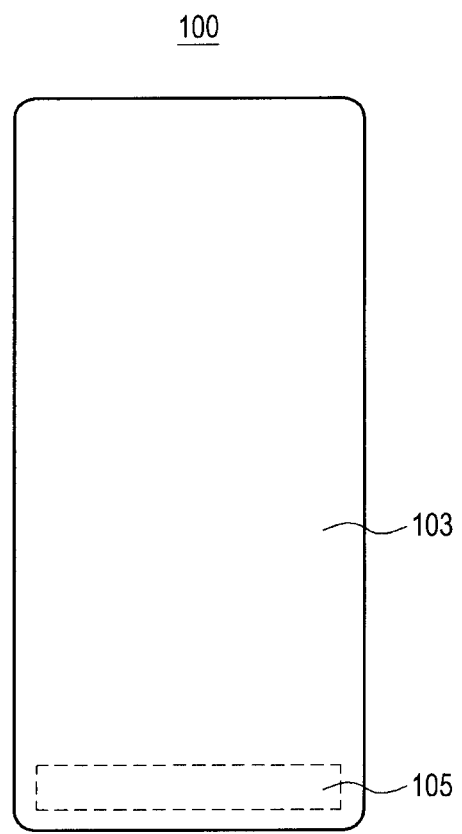
FIG. 4 is a rear view illustrating the electronic device according to the first one of various embodiments of the present disclosure.
Figure 5:
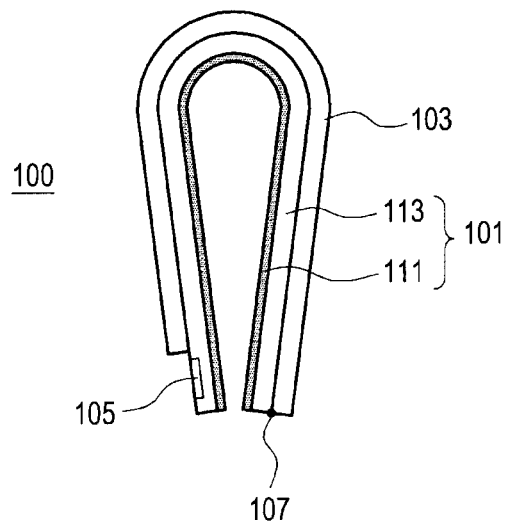
FIG. 5 is a cross-sectional view illustrating the electronic device according to the first one of various embodiments of the present disclosure in the folded state.

FIG. 2 is a perspective view illustrating an electronic device according to a first one of various embodiments of the present disclosure. FIG. 3 is a cross-sectional view illustrating the electronic device according to the first one of various embodiments of the present disclosure. FIG. 4 is a rear view illustrating the electronic device according to the first one of various embodiments of the present disclosure. FIG. 5 is a cross-sectional view illustrating the electronic device according to the first one of various embodiments of the present disclosure in the folded state.

Referring to FIGS. 2 to 5, according to one of various embodiments of the present disclosure, an electronic device 100 may include a first display device 101, a cover 103, and a second display device 105. Here, the electronic device 100 may be a portable terminal. However, the electronic device 100 may be any of various electronic devices that include a foldable display (e.g., a flexible display device) without being limited to the portable terminal.

The first display device 101 may include a body 113 and a flexible display device 111, and may be an image displaying device that is configured to be foldable. The body 113 may include a circuit unit (e.g., a circuit board) that processes communication, various pieces of information, or the like, a battery that supplies power, etc. The body 113 may be folded or unfolded. The flexible display device 111 is provided on the front face of the body 113, and may be folded or unfolded together with the body 113. The flexible display device 111 may output an image under a control of the circuit board included in the body 113, or the like. For example, the first display device 101 may include the flexible display device 111 so as to operate as an image displaying device.

The cover 103 is provided on the rear face of the body 113 to be foldable together with the body 113. The cover 103 may be formed of a flexible material, such as a leather material or a rubber material. However, the material of the cover 103 is not limited to the flexible material. A portion, which is deformed in a curved shape at a folding operation, of the cover 103 may be formed of a flexible material, and the cover 103 may also include a portion, which is capable of maintaining a predetermined shape regardless of the folding operation and that is formed of a rigid material, such as, for example, a plastic or a metal. Accordingly, a portion of the cover 103, which is capable of maintaining a predetermined shape even at the folding operation, may be provided with components that are required for the electronic device, such as a circuit unit (e.g., an antenna radiator).

The second display device 105 may be disposed, for example, on the rear face of the body 113 to be opposite to the flexible display device 111. As illustrated in FIGS. 3 and 4, the second display device 105 may be concealed by the cover 103 in the state where the body 113 is unfolded. In addition, when the body 113 is folded, for example, when two different portions of the body 113 are folded in the direction where the two different portions face each other, a portion of the rear face of the body 113 may be exposed depending on the thickness of the electronic device 100 and the curvature in the folded state, as compared to the state where the body 113 is unfolded. For example, as illustrated in FIGS. 2 and 5, the second display device 105 may be exposed to the outside of the cover 103 in the state where the body 113 is folded. This is caused due to a difference in relative displacement between the first display device 111 and the cover 103 at the folding operation. The first display device 111 and the cover 103 may be coupled to be at least partially slidable in relation to each other.

As the second display device 105 is exposed in the state where the electronic device is folded, various pieces of information, such as weather information, time, phone call reception, and text message reception, may be output through the second display device 105. Accordingly, the user may use the electronic device 100 while confirming various pieces of information through the second display device 105 even in the state where the flexible display device 111 is folded.

In addition, when a touch screen function is incorporated into the second display device 105, a displayed icon may be changed or an operation mode of the electronic device may be changed according to the user's touch input.

Referring to FIG. 5, while one end of the body 113 and one end of the cover 103 are fixed to each other at a first fixing portion 107, the cover 103 may be coupled to the body 113 to be at least partially slidable. Accordingly, when the electronic device 100 is folded, the other end of the cover 103 may move toward the central portion of the cover 103 such that a portion of the rear surface of the body 113 can be exposed. By arranging the second display device 105 in the region that is exposed according to the movement of the cover 103, the second display device 105 may be exposed to the outside of the cover 103 as the first cover 103 is slid.

Figure 6:
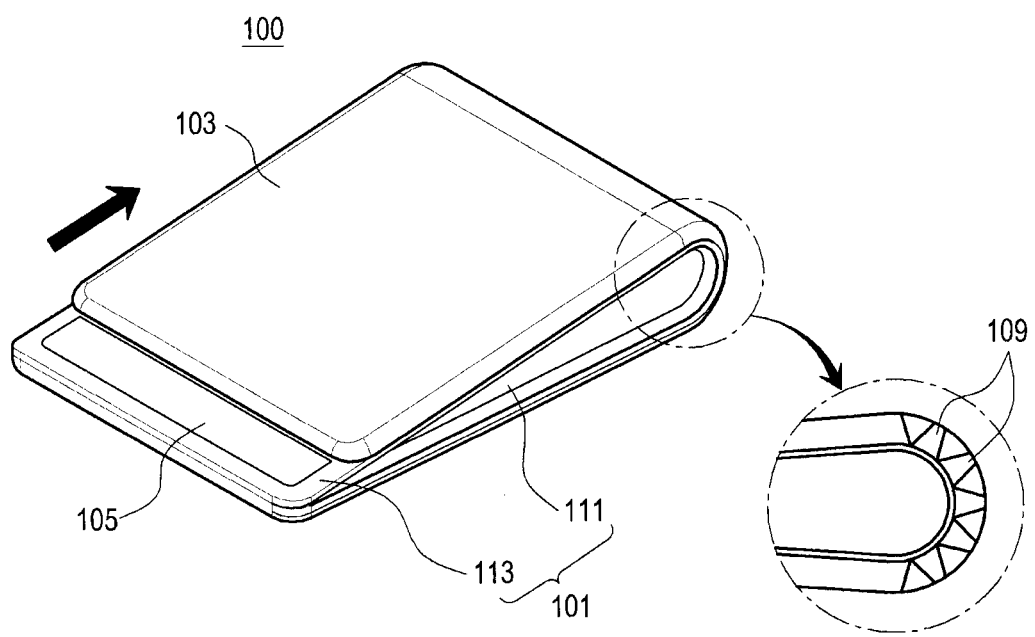
FIG. 6 is a perspective view illustrating the electronic device according to first one of various embodiments of the present disclosure in the folded state.
Figure 7:
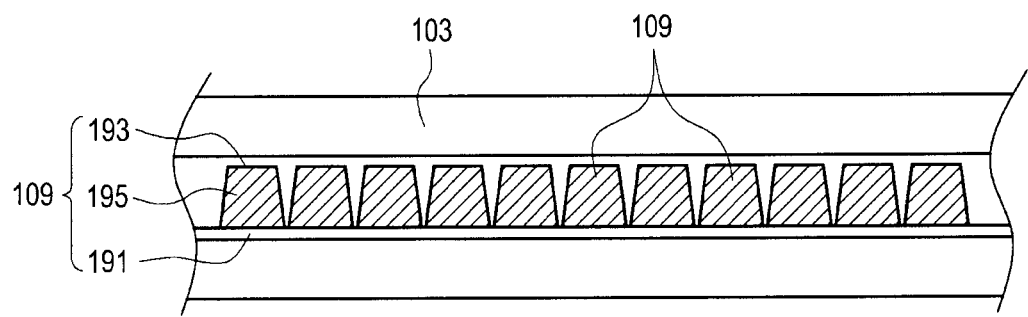
FIG. 7 is a illustrating a joint portion of FIG. 6 in an unfolded state.

FIG. 6 is a perspective view illustrating the electronic device according to first one of various embodiments of the present disclosure in the folded state. FIG. 7 is a illustrating a joint portion of FIG. 6 in an unfolded state.

Referring to FIGS. 6 and 7, according to the first one of various embodiments of the present disclosure, the electronic device may include a plurality of joints 109. Each of the joints 109 may include a first facing portion 191, a second facing portion 193, and inclined portions 195. The first facing portion 191 may face the first display device 101. The second facing portion 193 may have a length that is shorter than that of the first facing portion 191, and may face the cover 103. The inclined portions 195 interconnect the opposite ends of the first facing portion 191 to the opposite ends of the second facing portion 193, respectively, and may be inclined relative to the first facing portion 191. Even if the first display device 101 are folded in the direction in which the two different regions face each other, the plurality of joints 109 are placed in the state where the entire length of the surface, on which the first facing portions 191 are arranged, may be maintained to be the same as the unfolded state. For example, at the folding or unfolding operation, the joints 109 may stably support the first display device 101 while causing the first display device 101 to be deformed at a proper curvature. On the contrary, at the folding operation, in the portion that is deformed in a curved shape, the length of the cover 103, which is arranged on the second facing portions 193 may be changed by the change in distance between the second facing portions 193. The change in the length of the cover 103 in the portion that is deformed in the curved shape may move the other end of the cover 103 toward the central portion of the cover 103.

As described above, according to the first one of various embodiments of the present disclosure, since the electronic device 100 includes a plurality of joints 109 that face each of the first display device 101 and the cover 103, at least a portion of the cover 103 may be relatively moved in relation to the first display device 101 in the state where the body 113 and the cover 103 are folded.

Figure 8:
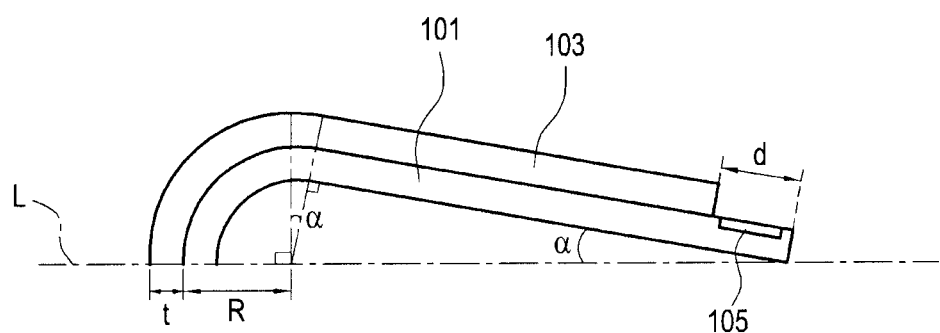
FIG. 8 is a view illustrating a relationship between a region in which the second display is exposed and a thickness of a cover, which are applied to the electronic device according to the first one of various embodiments of the present disclosure.

FIG. 8 is a view illustrating a relationship between a region in which the second display is exposed and a cover, which are applied to the electronic device according to the first one of various embodiments of the present disclosure. First, with reference to FIG. 8, a center line "L", a radius "R", a thickness "t", a slope "a", and a displacement "d" are defined. The center line "L" may be a virtual line that interconnects the center and the contact point of the opposite ends of the folded first display device 101. The radius "R" may refer to a curvature radius of a curved portion that is formed as the first display device 101 is folded. The thickness "t" may refer to the thickness of the cover 103. The slope α may indicate an inclined angle of the first display device 101 in relation to the center line "L". The displacement "d" may refer to the displacement of the other end of the cover 103 in relation to the first display device 101.

As illustrated in FIG. 8, as the first display device 101 is folded, the cover 103 may be positioned at a radius ("R"+ "t") that is larger than the radius R of the first display device 101. When the lengths of the cover 103 and the first display device 101 are practically unchanged in the portion that is deformed in the curved shape, the cover 103, which has the larger radius at the other end of the first display device 101, may move relative to the first display device 101 in the process of being folded or unfolded. For example, as the thickness t of the cover 103 increases, the relative movement of the cover 103 with respect to the first display device 101 may further increase. Accordingly, the second display device 105 may be set to correspond to the displacement "d" that corresponds to the distance that the of the cover 103 moves relative to the first display device 101. That is, the second display device 105 may be set to correspond to the displacement that is proportional to the thickness "t" of the cover 103. For example, the size of the second display device 105 may be set to correspond to the displacement that is proportional to the thickness t of the cover 103.

In addition, the relative movement of the cover 103 is variable depending on the slope α. For example, when the slope α increases, the radius R of the first display device 101 may also increase, which may increase the relative movement of the cover 103 with respect to the first display device 101.

Figure 9:
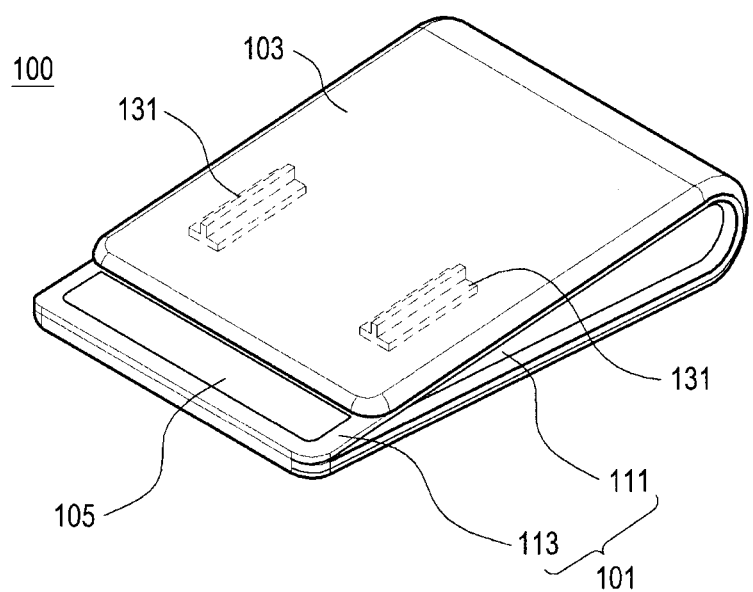
FIG. 9 is a view illustrating a guide that is applied to the electronic device according to the first one of various embodiments of the present disclosure.
Figure 10:
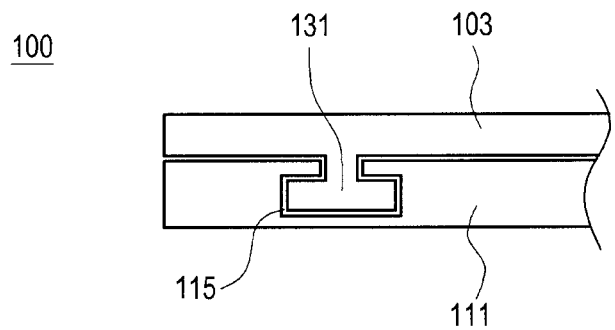
FIG. 10 is a cross-sectional view illustrating a first guide and a first guide hole, which are applied to the electronic device according to the first one of various embodiments of the present disclosure.

FIG. 9 is a view illustrating a guide that is applied to the electronic device according to the first one of various embodiments of the present disclosure. FIG. 10 is a cross-sectional view illustrating a first guide and a first guide hole, which are applied to the electronic device according to the first one of various embodiments of the present disclosure.

Referring to FIGS. 9 and 10, according to the first one of various embodiments of the present disclosure, the cover 103, which is applied to the electronic device 100, may include a first guide 131, and the body 113 may include a first guide hole 115.

The first guide 131 may be formed to extend from the lower portion of the cover 103 and to protrude toward the body 113. The first guide 131 may be formed in the longitudinal direction of the cover 103, for example, along a direction in which the cover 103 moves relative to the body 113. The first guide hole 115 is provided in the body 113, and may be formed to correspond to the first guide 131. In addition, the first guide 131 may be slid along the first guide hole 115 while being restrained by the first guide hole 115.

In this way, according to the first one of various embodiments of the present disclosure, in the electronic device 100, as the first guide 131 is slid while being restrained by the first guide hole 115, the cover 103 may correspondingly move relative to the body 113 without being released from the body 113.

Figure 11:
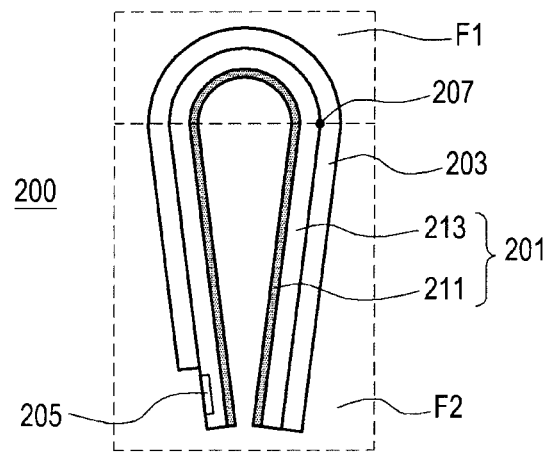
FIG. 11 is a cross-sectional view illustrating an electronic device according to a second one of various embodiments of the present disclosure in a folded state.

FIG. 11 is a cross-sectional view illustrating an electronic device according to a second one of various embodiments of the present disclosure in a folded state.

Referring to FIG. 11, according to the second one of various embodiments of the present disclosure, because the first display device 201, the cover 203, and the second display device 205 of the electronic device 200 are similar to those of the above-described embodiment, detailed descriptions thereof will be omitted.

According to the second one of various embodiments of the present disclosure, the electronic device 200 may include a first region F1 and a second region F2. The first region F1 may refer to a region that is deformed in a curved shape in the state where the electronic device 200 is folded. The second region F2 may refer to two regions that face each other in the state where the electronic device 200 are folded.

The first display device 201 may include a body 213 and a flexible display device 211, and may be an image displaying device that is configured to be foldable. The body 213 of the first display device 201 and the cover 205 may be fixed to a second fixing portion 207 at a side of the portion in which the first region F1 and the second region F2 are connected to each other. One side of the body 213 and one side of the cover 203 that are fixed to the second fixing portion 207 may be fixed without being affected by the relative movements of the body 213 and the cover 203 in the first region F1. The other side of the cover 203 may be moved toward the first region F1 by the relative movements of the body 213 and the cover 203 in the first region F1. Accordingly, the second display device 205 may be exposed to the outside of the cover 203.

Figure 12:
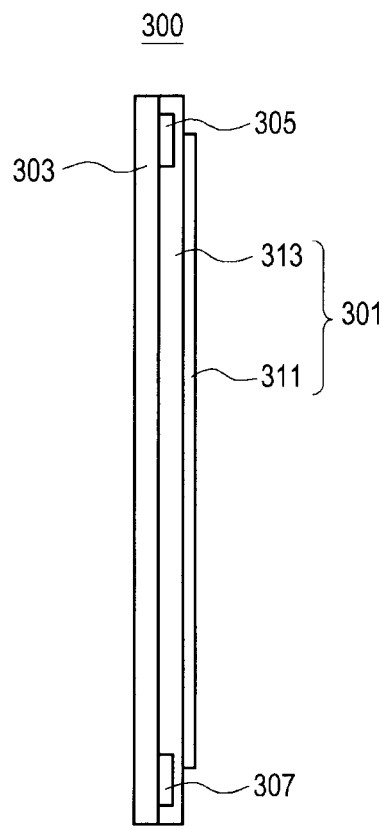
FIG. 12 is a cross-sectional view illustrating an electronic device according to a third one of various embodiments of the present disclosure.
Figure 13:
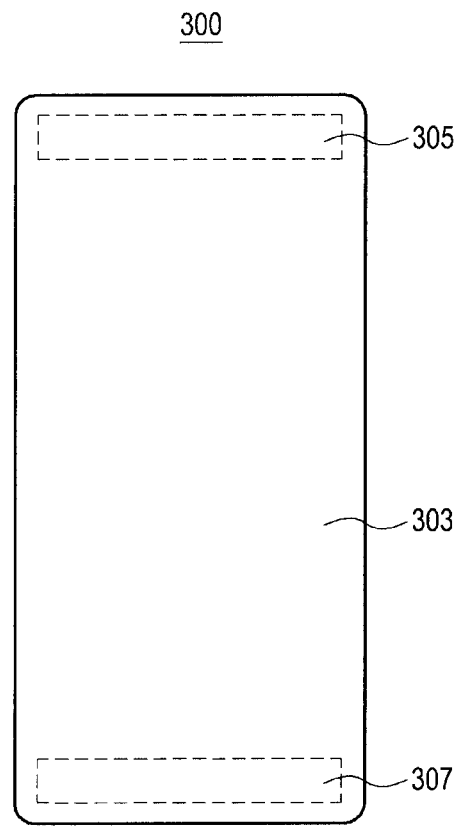
FIG. 13 is a rear view illustrating the electronic device according to the third one of various embodiments of the present disclosure.
Figure 14:
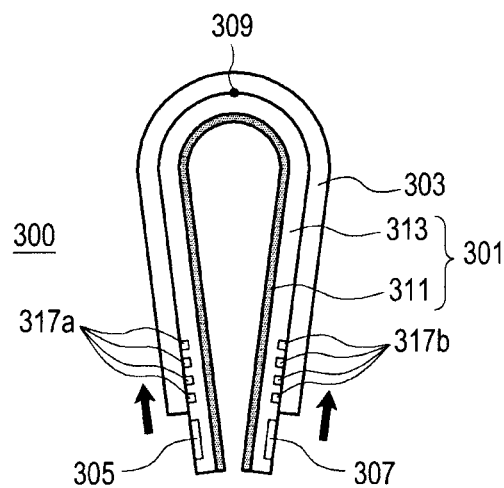
FIG. 14 is a cross-sectional view illustrating the electronic device according to the third one of various embodiments of the present disclosure in the folded state.

FIG. 12 is a cross-sectional view illustrating an electronic device according to a third one of various embodiments of the present disclosure. FIG. 13 is a rear view illustrating the electronic device according to the third one of various embodiments of the present disclosure. FIG. 14 is a cross-sectional view illustrating the electronic device according to the third one of various embodiments of the present disclosure in the folded state.

Referring to FIGS. 12 to 14, according to the third one of various embodiments of the present disclosure, because the first display device 301, the cover 303, the second display devices 305 and 307 of the electronic device 300 are the same as those of the above-described embodiments, detailed descriptions thereof will be omitted.

The body 313 of the first display device 301 and the cover 303 may be fixed to each other at a third fixing portion 309 where the central portion of the body 313 and the central portion of the cover 303 are in contact with each other. In addition, when the body 313 and the cover 303 are folded, the opposite ends of the cover 303 may be slid on the body 313 toward the third fixing portion 309 as in the preceding embodiments.

In addition, the second display devices 305 and 307 may be provided on the opposite ends of the body 313, respectively. The second display devices 305 and 307 may be exposed to the outside or exterior area of the cover 303 as the opposite ends of the cover 303 are slid.

In addition, the body 313 may be provided with sensors 317a and 317b that sense the sliding extents of the opposite ends of the cover 303 along the rear face of the body 313. The sensors 317a and 317b may be optical sensors that sense the movements of the opposite ends of the cover 303 or may be configured to be in physical contact with the cover 303 to sense the opposite ends of the cover 303. The sensors 317a and 317b may include first sensors 317a that are arranged to be spaced apart from one 305 of the second display devices and second sensors 317b that are arranged to spaced apart from the other 307 of the second display devices. The first sensors 317a and the second sensors 317b may be arranged to be symmetrical with each other with reference to the third fixing portion 309. For example, the first sensors 317a and the second sensors 317b may be oppositely oriented to each other when the body 313 and the cover 303 are folded. The first sensors 317a may sense the outwardly exposed extent of one 305 of the second display devices, and the second sensors 317b may sense the outwardly exposed extent of the other 307 of the second display devices. That is, the first and second sensors 317a and 317b may sense the outwardly exposed extents of the second display devices 305 and 307, respectively, and may transmit sensing signals to a processor of the electronic device, and the processor may calculate each of the outwardly exposed areas of the second display devices 305 and 307. In addition, the processor may calculate the folded degree of the flexible display device 311 (e.g., a relative angle between one portion of the body 313, on which one 305 of the second display devices is provided, and the other portion of the body 313, on which the other 307 of the second display devices is provided) based on the sensing signals. In addition, the third one of various embodiments of the present disclosure exemplifies a configuration in which the sensors 317a and 317b are arranged on the body 313. However, the sensors 317a and 317b may be arranged on the cover 303 rather than on the body 313, and may be electrically connected with a circuit unit within the body 313.

Figure 15:
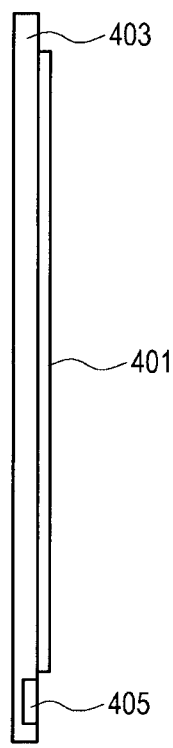
FIG. 15 is a cross-sectional view illustrating an electronic device according to a fourth one of various embodiments of the present disclosure.
Figure 16:
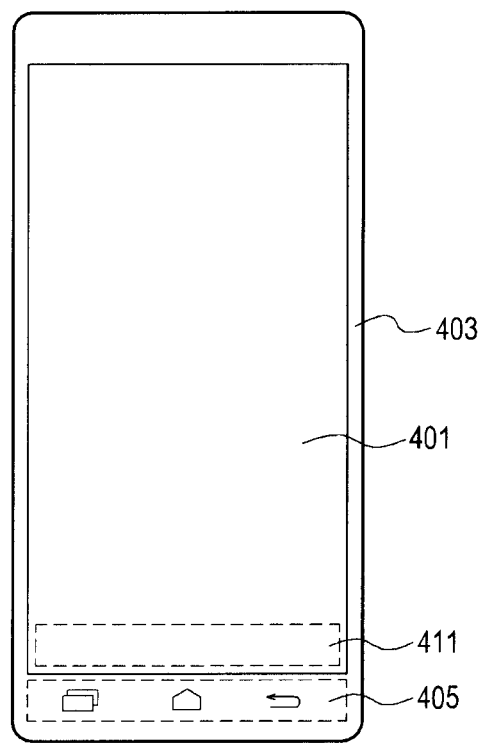
FIG. 16 is a front view illustrating the electronic device according to the fourth one of various embodiments of the present disclosure.
Figure 17:
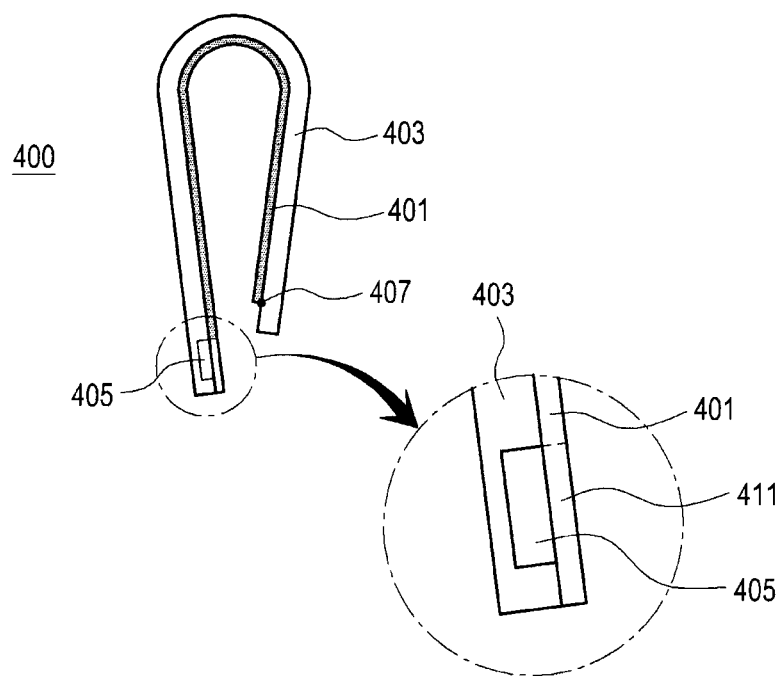
FIG. 17 is a cross-sectional view illustrating the electronic device according to the fourth one of various embodiments of the present disclosure in the folded state.

FIG. 15 is a cross-sectional view illustrating an electronic device according to a fourth one of various embodiments of the present disclosure. FIG. 16 is a front view illustrating the electronic device according to the fourth one of various embodiments of the present disclosure. FIG. 17 is a cross-sectional view illustrating the electronic device according to the fourth one of various embodiments of the present disclosure in the folded state.

Referring to FIGS. 15 to 17, according to the fourth one of various embodiments of the present disclosure, an electronic device 400 may include a body 403, a flexible display device 401, and a touch key unit 405.

The body 403 may include a circuit unit that processes communication, various pieces of information, or the like and a battery that supplies power, and may be configured to be foldable.

The flexible display device 401 may be provided on the front face of the body 403 to output an image. The flexible display device 401 may be folded/unfolded together with the body 403. An end of the flexible display device 401 may be fixed with the body 403 at a fourth fixing portion 407 where the body 403 is in contact with the flexible display device 401. In addition, the flexible display device 401 may be slid on the body 403 in the state in which it is fixed to the fourth fixing portion 407.

In addition, when the flexible display device 401 and the body 403 are folded together in a direction where the two different regions of the flexible display device 401 face each other, a great portion of the flexible display device 401 may be concealed by the body 403. In the process of folding the two different regions in the direction where the two different regions face each other, at least a portion of the flexible display device 403 (e.g., the other end of the flexible display device 403) may be slid on the body 403. For example, in the state where the electronic device 400 is folded, at least a portion 411 (hereinafter, referred to as an "exposed region") of the flexible display device may be exposed to the outside of the body 403. For example, in the state where the electronic device 400 is folded, the exposed region 411 may be moved to be positioned on the touch key unit 405.

The touch key unit 405 may be provided on the other end of the body 403. The touch key unit 405 may be provided with a home key at the center thereof, and function keys on left and right with reference to the home key. In addition, the exposed region 411 may conceal the touch key unit 405 in the state where the flexible display device 401 is folded.

Accordingly, according to the fourth one of various embodiments of the present disclosure, in the electronic device 400, when the flexible display device 401 and the body 403 are folded together, the exposed region 411 is exposed to the outside of the body 403 so that the user can operate the electronic device 400 through the exposed region 411.

Figure 18:
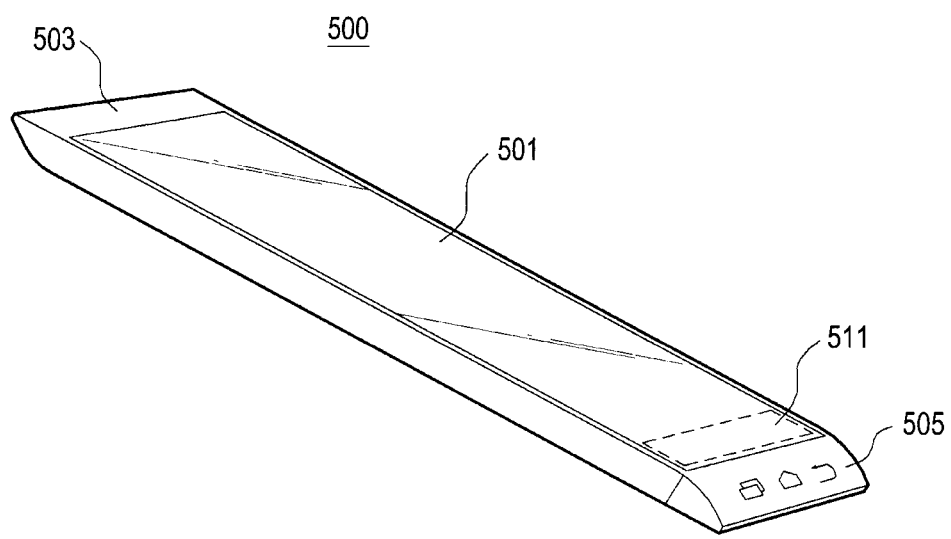
FIG. 18 is a perspective view illustrating an electronic device according to a fifth one of various embodiments of the present disclosure in the unfolded state.
Figure 19:
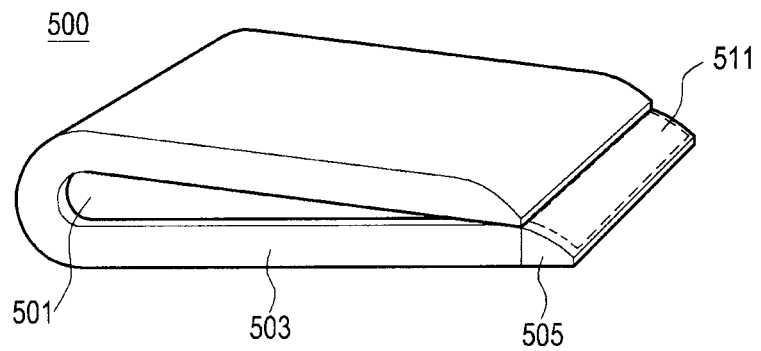
FIG. 19 is a perspective view illustrating the electronic device according to the fifth one of various embodiments of the present disclosure in the folded state.

FIG. 18 is a perspective view illustrating an electronic device according to a fifth one of various embodiments of the present disclosure in the unfolded state. FIG. 19 is a perspective view illustrating the electronic device according to the fifth one of various embodiments of the present disclosure in the folded state.

Referring to FIGS. 18 and 19, according to the fifth one of various embodiments of the present disclosure, the electronic device 500 may include a body 503, a flexible display device 501, and a touch key unit 505. The touch key unit 505 may have an inclined structure. In the state where the flexible display device 501 is folded, at least portion 511 (hereinafter, referred to as an "exposed region") may be slid along the inclined touch key unit 505.

Figure 20:
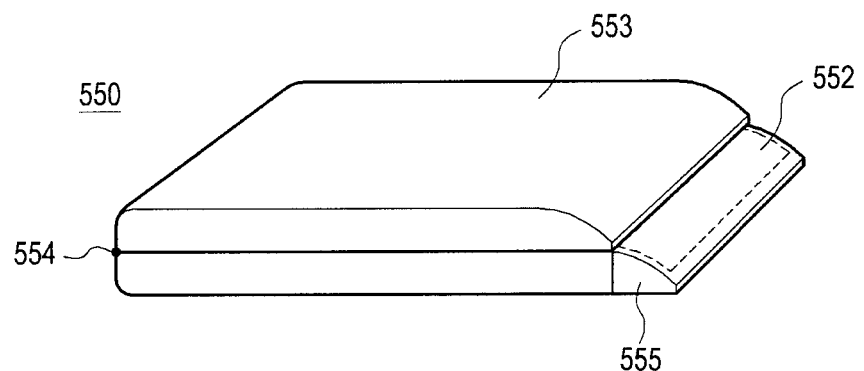
FIG. 20 is a perspective view illustrating an electronic device according to a sixth one of various embodiments of the present disclosure in the folded state.

FIG. 20 is a perspective view illustrating an electronic device according to a sixth one of various embodiments of the present disclosure in the folded state.

Referring to FIG. 20, according to the sixth one of various embodiments of the present disclosure, a body 553, which is applied to an electronic device 550, is provided with a hinge portion 554 such that the body 553 may be folded about the hinge portion 554. When the body 553 is folded together with the flexible display device (not illustrated), the flexible display device (not illustrated) may be in close contact with the body 553. In addition, the exposed region 552 may be exposed to the outside of the body 553. The electronic device 550 may similarly to the electronic device 500 include a touch key unit 555 that is similar to the touch key unit 505.

As described above, according to the sixth one of various embodiments of the present disclosure, the electronic device 550 is not limited to the electronic device that is provided with the plurality of joints as described above, but may be folded with various structures, such as the hinge portion 554, as exemplified in the present embodiment.

Figure 21:
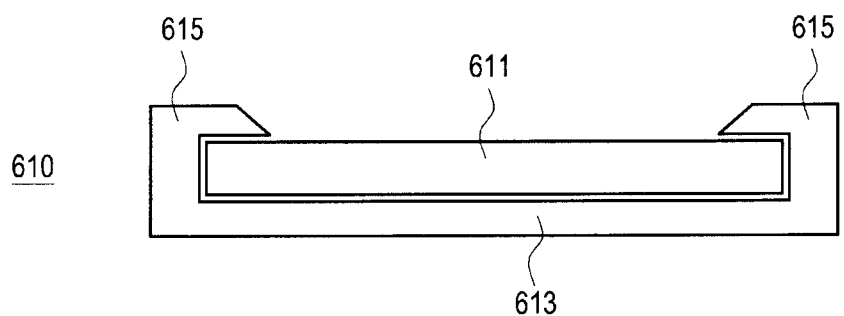
FIG. 21 is a cross-sectional view illustrating a first bezel that is applied to an electronic device according to a seventh one of various embodiments of the present disclosure.

FIG. 21 is a cross-sectional view illustrating a first bezel that is applied to an electronic device according to a seventh one of various embodiments of the present disclosure.

Referring to FIG. 21, according to still another one of various embodiments of the present disclosure, a body 613, which is applied to an electronic device 610, may include a first bezel 615.

The first bezel 615 may enclose the side surfaces of the flexible display device 611. For example, as the first bezel 615 restrains the side surfaces of the flexible display device 611, the flexible display device 611 may be slid on the body 613 without being released. When a portion of the flexible display device 611 is slid on the body 613, at least a sliding portion of the flexible display device 611 may be positioned on the first bezel 615.

Figure 22:
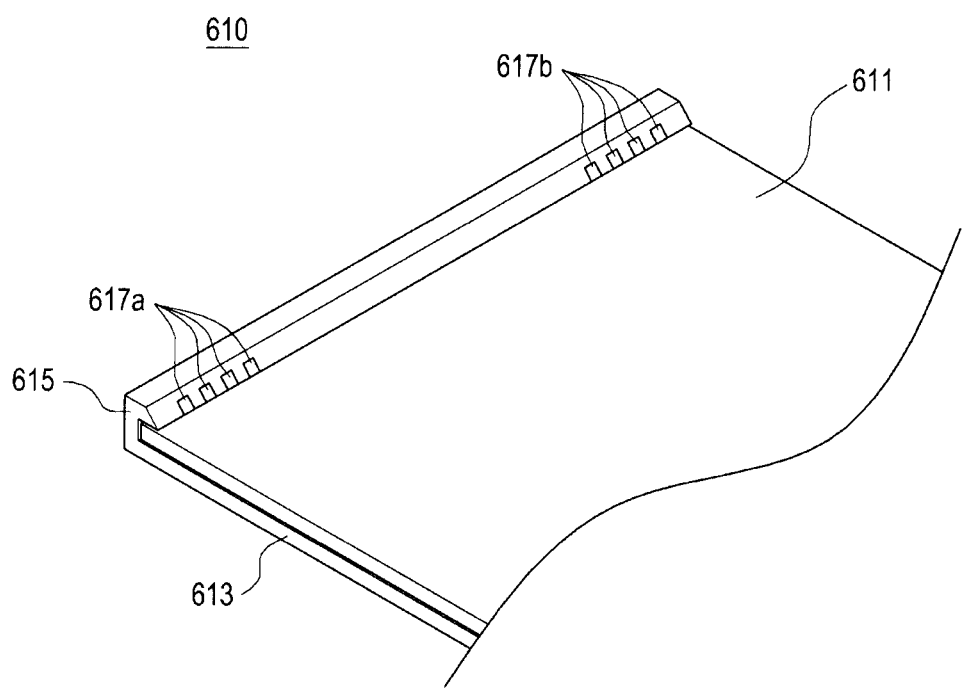
FIG. 22 is a perspective view illustrating the electronic device according to an eighth one of various embodiments of the present disclosure in a state where the electronic device is partially cut.

FIG. 22 is a perspective view illustrating the electronic device according to an eighth one of various embodiments of the present disclosure in a state where the electronic device is partially cut.

Referring to FIG. 22, according to the eighth one of various embodiments of the present disclosure, an electronic device 610 may include sensors 617a and 617b that sense a sliding extent of the flexible display device 611.

Figure 23:
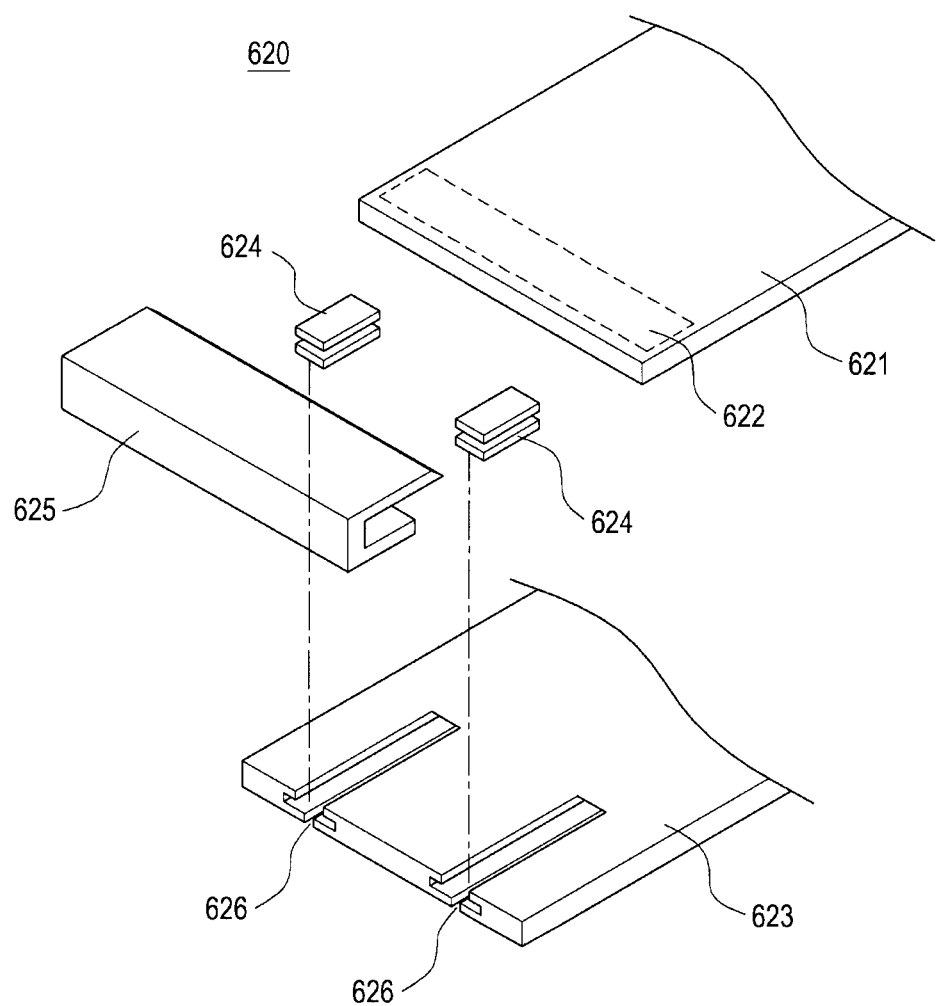
FIG. 23 is an exploded perspective view illustrating an electronic device according to a ninth one of various embodiments of the present disclosure.
Figure 24:
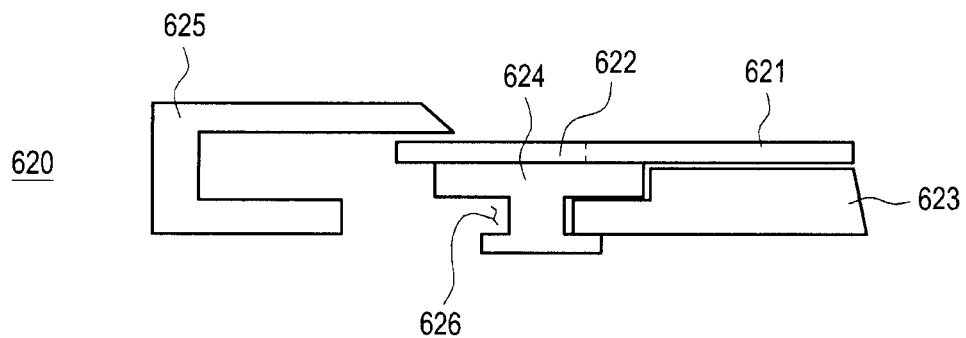
FIG. 24 is a cross-sectional view illustrating a second bezel and a second guide in a state where the electronic device according to the ninth one of various embodiments of the present disclosure is unfolded.
Figure 25:
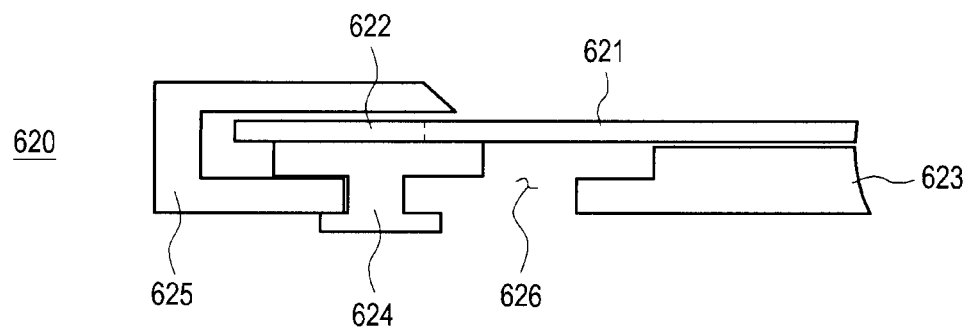
FIG. 25 is a cross-sectional view illustrating the second bezel and the second guide in a state where the electronic device according to the ninth one of various embodiments of the present disclosure is folded.

The sensors 617a and 617b may be arranged on the first bezel 615 along the direction in which the flexible display device 611 is slid. The sensors 617a and 617b may be optical sensors that optically sense the movement of the flexible display device 611 or may be configure to be in physical contact with the flexible display device 611 to sense the movement of the flexible display device 611. The sensors 617a and 617b may include first sensors 617a that are sequentially arranged on the first bezel 615 to be adjacent to one end of the flexible display device 611, and second sensors 617b that are sequentially arranged on the first bezel 615 to be adjacent to the other end of the flexible display device 611. In addition, the first sensors 617a and the second sensors 617b may be oriented to face each other in the state where the flexible display device 611 is folded. The first sensors 617a may sense the sliding extent of the one end of the flexible display device 611, and the second sensors 617b may sense the sliding extent of the other end of the flexible display device 611. In addition, the sensors 617a and 617b may sense the sliding extent of the flexible display device 613 and may transmit a sensing signal to a processor of the electronic device. The processor may calculate the outwardly exposed area of the exposed region 511 (see FIG. 18) of the flexible display device 511 (see FIG. 18). In addition, the processor may calculate the folded degree of the flexible display device 611 (e.g., a relative angle between a portion of the flexible display device 611 and another portion of the flexible display device 611 with reference to the center of the flexible display device 611) based on the sensing signal. In addition, according to the eighth one of various embodiments of the present disclosure, the sensors 617a and 617b may be provided on the body 613 that is in contact with the flexible display device 611, rather than being arranged on the first bezel 615. FIG. 23 is an exploded perspective view illustrating an electronic device according to a ninth one of various embodiments of the present disclosure. FIG. 24 is a cross-sectional view illustrating a second bezel and a second guide in a state where the electronic device according to the ninth one of various embodiments of the present disclosure is unfolded. FIG. 25 is a cross-sectional view illustrating the second bezel and the second guide in a state where the electronic device according to the ninth one of various embodiments of the present disclosure is folded.

Referring to FIGS. 23 to 25, according to the ninth one of various embodiments of the present disclosure, an electronic device 620 may include a body 623, a flexible display device 621, a second guide 624, and a second guide hole 625.

The body 623 may include a second bezel 625. The second bezel 625 may be provided at the lower side of the body 623. As the flexible display device 621 is slid on the body 623, at least a portion 622 (hereinafter, referred to as an "exposed region") of the flexible display device may be selectively accommodated in the second bezel 625. For example, when the flexible display device 622 is folded, at least a portion of the flexible display device 622 (e.g., the exposed region 622) may be slid on the body 623 to be accommodated in the second bezel 625. Accordingly, when the flexible display device 621 is slid on the body 623, the exposed region 622 may be selectively accommodated in the second bezel 625 to be protected from external impact by the second bezel 625. When the second bezel 625 is made of a transparent material, various pieces of information, such as text or an image, may be output through the exposed region 622 even in the state where the second bezel 625 is accommodated.

The second guide 624 may extend from the flexible display device 621 to be slid on the body 623. The second guide 624 may extend along the longitudinal direction of the flexible display device 621. The second guide recess 626 is formed in the body 623 to correspond to the second guide 624. The second guide 624 may be accommodated in the second guide recess 626 to be slidable. The exposed region 622 is slidable on the body 623 while the second guide 624 is guided by the second guide recess 626.

Figure 26:
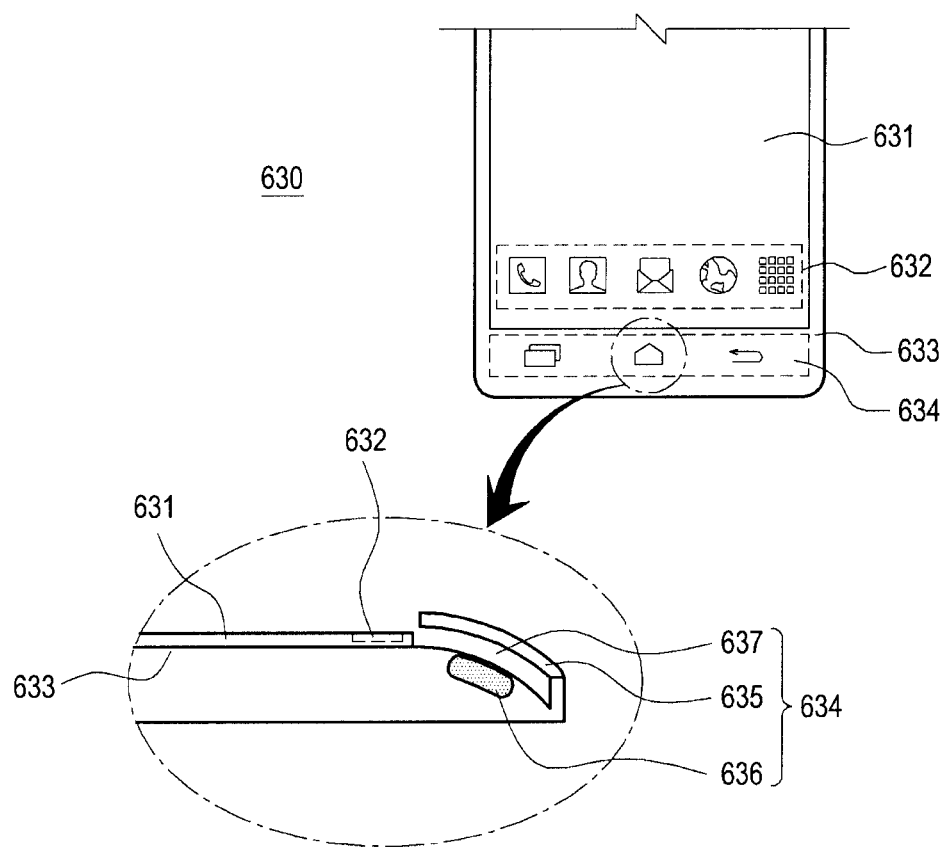
FIG. 26 is a view illustrating an electronic device according to a tenth one of various embodiments of the present disclosure in the unfolded state.
Figure 27:
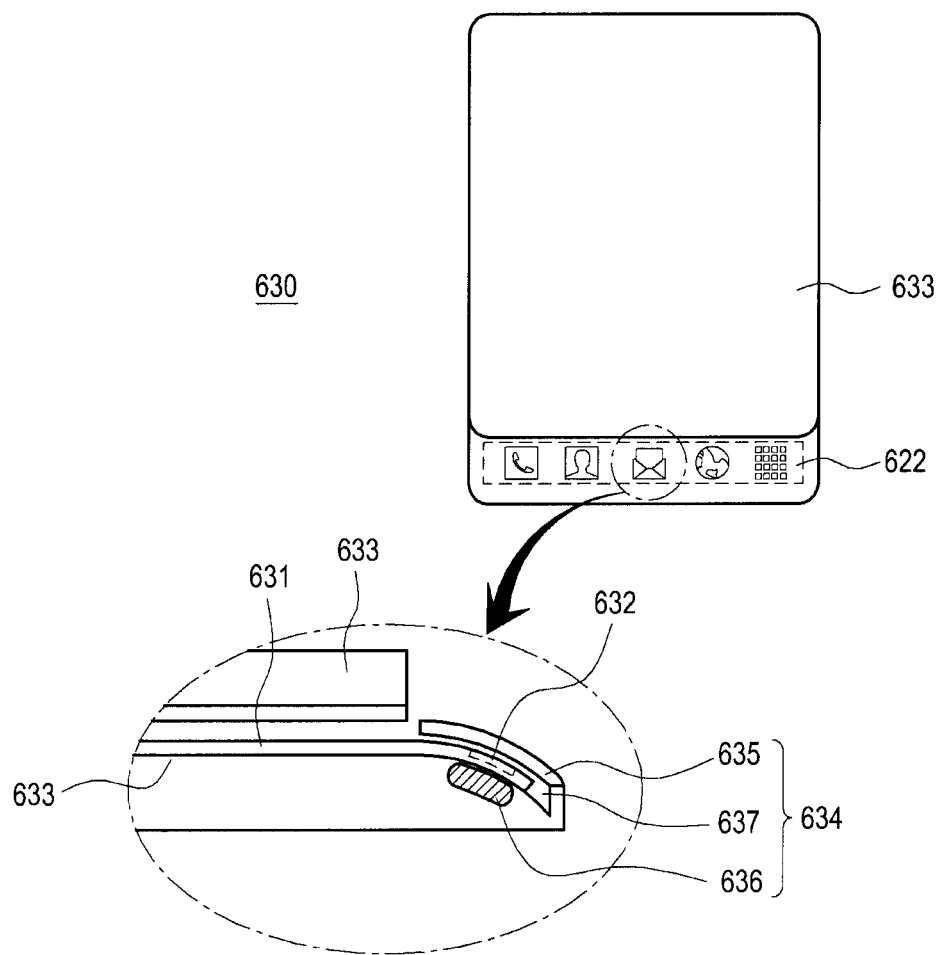
FIG. 27 is a view illustrating the electronic device according to the tenth one of various embodiments of the present disclosure in the folded state.

FIG. 26 is a view illustrating an electronic device according to a tenth one of various embodiments of the present disclosure in the unfolded state. FIG. 27 is a view illustrating the electronic device according to the tenth one of various embodiments of the present disclosure in the folded state.

According to the tenth one of various embodiments of the present disclosure, an electronic device 630 may include a body 633, a flexible display device 631, and a touch key unit 634.

The touch key unit 634 may include a touch window member 635, a light emitting member 636, and an insertion groove 637. The touch window member 635 may be arranged on the body 633. The touch window member 635 may be formed of a glass material. However, the touch window member 635 may be various transparent materials without being limited to the glass material. In addition, the touch window member 635 may include a touch panel to generate a signal by the user's touch. The light emitting member 636 may be provided inside the touch window member 635 to provide light. The light emitting member 636 may be constituted with a Light Emitting Diode (LED). However, the light emitting member 636 may be any of various lighting devices that provide light, without being limited to the LED. The insertion groove 637 may be formed between the touch window member 635 and the light emitting member 636. In the process of folding the flexible display device 631, at least a portion 632 (hereinafter, referred to as an "exposed region") of the flexible display device 631 may be slid on the body 633. Accordingly, as illustrated in FIG. 27, the exposed region 632 may be accommodated in the insertion groove 637 in the folded state. The touch window member 635 may be formed of a transparent material so that the exposed region 632 may be visually exposed to the outside of the body 633 even in the state where the touch window member 635 is accommodated in the insertion groove 637.

The light emitting member 636 may be turned on/off depending on whether the exposed region 632 is inserted into the insertion groove 637. For example, the light emitting member 636 does not provide light in the state where the exposed region 632 is inserted into the insertion groove 637 while the light emitting member 636 may provide light in the state where the exposed region 632 is not inserted into the insertion groove 637. Thus, in the state where the flexible display device 631 is unfolded, the light emitting member 636 may provide light so as to guide the user to conveniently use the touch key unit 634. In addition, when the flexible display device 631 is folded, the light emitting member 636 does not provide light so as to prevent the light from interfering with the information that is displayed on the exposed region 632.

Figure 28:
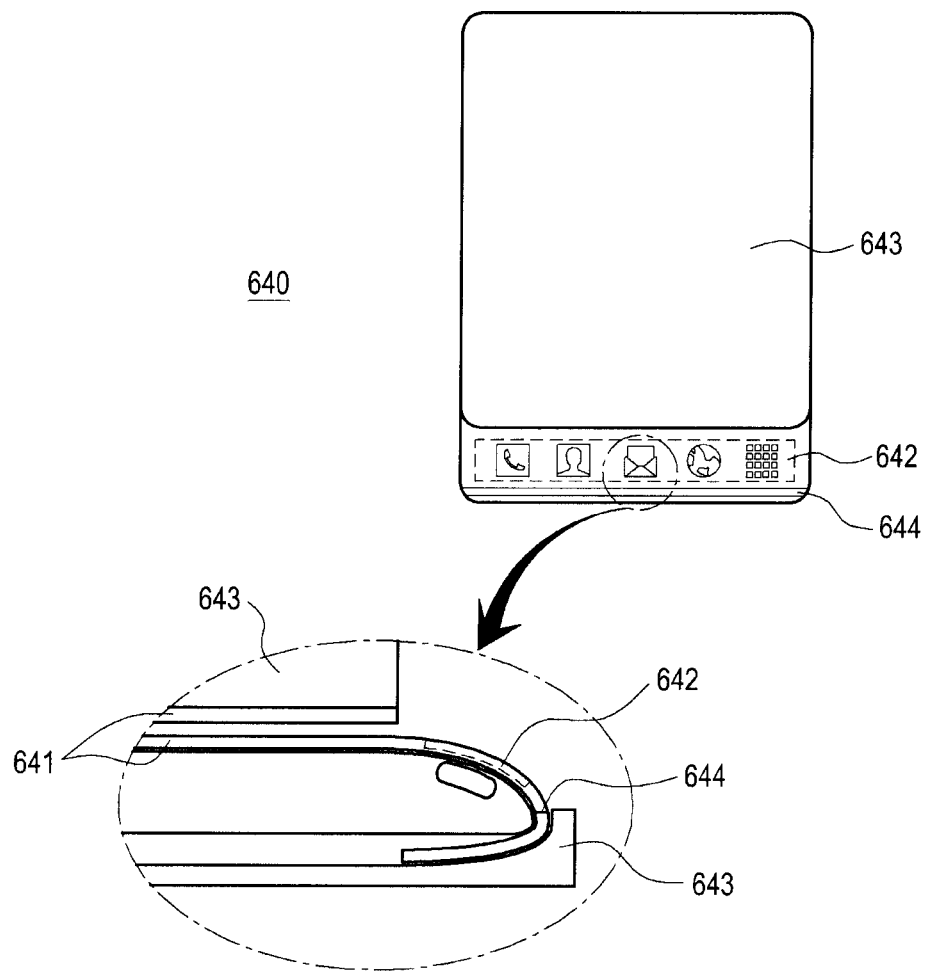
FIG. 28 is a view illustrating an electronic device according to an eleventh one of various embodiments of the present disclosure.

FIG. 28 is a view illustrating an electronic device according to an eleventh one of various embodiments of the present disclosure.

Referring to FIG. 28, according to the eleventh one of various embodiments of the present disclosure, an electronic device 640 may include a body 643 and a flexible display device 641. At least a portion of the flexible display device 641 may include an exposed region 642.

One end of the body 643 may include a body hole 644 that corresponds to one end of the flexible display device 641. In addition, when the flexible display device 641 is folded in a direction where it faces the body 643, the flexible display device 641 may be folded while being enclosed by the body 643. At this time, at least a portion of the flexible display device 641 may be slid on the body 643. In addition, when one end of the flexible display device 641 is fixed on the body 643, the other end of the flexible display device 641 is slid on the body 643 to be accommodated in the body hole 644. For example, the other end of the flexible display device 641 may be slid with respect to the body 643 to be selectively accommodated in the body hole 644. In addition, a portion (hereinafter, referred to as an "exposed region") of the flexible display device 641 may be a portion other than the portion that is enclosed by the folded body 643 and the portion that is accommodated in the body hole 644.

Figure 29:
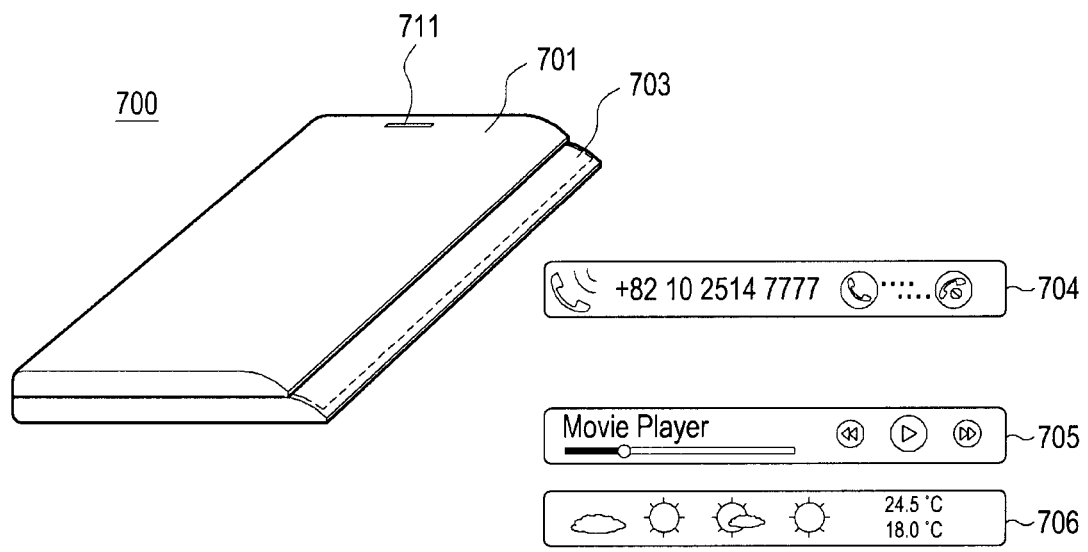
FIG. 29 is a view illustrating an electronic device according to a twelfth one of various embodiments of the present disclosure.

FIG. 29 is a view illustrating an electronic device according to a twelfth one of various embodiments of the present disclosure.

Referring to FIG. 29, according to the twelfth one of various embodiments of the present disclosure, an electronic device 700 may include a body 701, a flexible display device (not illustrated), and a voice receiving unit 711. Here, the electronic device 700 illustrated in FIG. 29 may be configured such that a great portion of the folded flexible display device (not illustrated) (e.g., a portion other than the portion 703 (hereinafter, referred to as an "exposed region") of the flexible display device) may be concealed by the body 701.

Similarly to the preceding embodiments, the exposed region 703 may be slid on the body 701 in the process of folding the flexible display device to be exposed to the outside of the body 701.

The voice receiving unit 711 may be provided on the rear face of the body 701. In addition, a phone icon 704 may be displayed on the exposed region 703. Thus, the user may make a phone call by touching the phone icon 704 that is displayed on the exposed region 703 without unfolding the folded electronic device 700 again.

However, without being limited to displaying the phone icon 704, various icons, such as a movie icon 705 and a weather icon 706, may be displayed on the exposed region 703.

Figure 30:
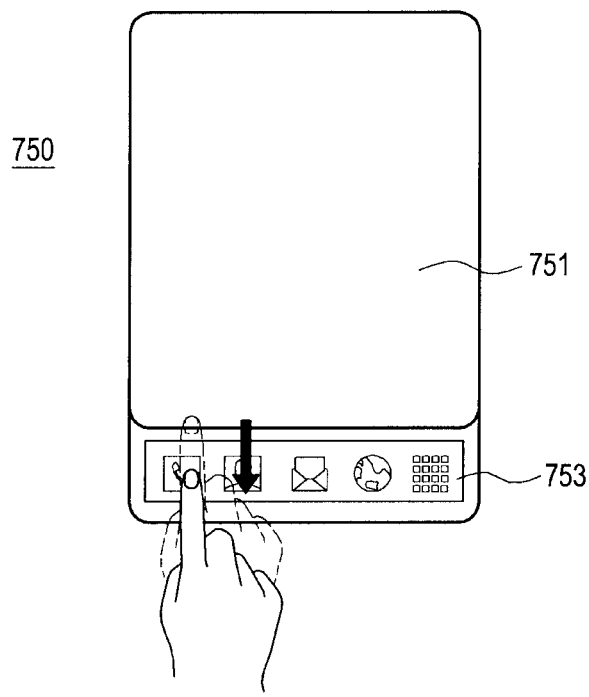
FIG. 30 and FIG. 31 are views illustrating an appearance of operating an electronic device according to a thirteenth one of various embodiments of the present disclosure.
Figure 31:
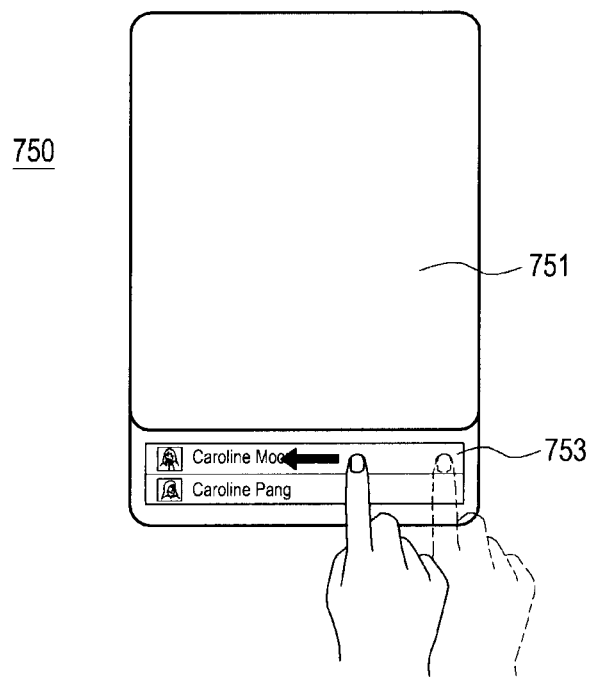

FIGS. 30 and 31 are views illustrating an aspect of operating an electronic device according to a thirteenth one of various embodiments of the present disclosure.

Referring to FIGS. 30 and 31, according to the thirteenth one of various embodiments of the present disclosure, an exposed region 753, which is applied to an electronic device 750, may change a displayed icon according to the user's touch input. For example, the user touches the exposed region 753 in an up-and-down direction, the icon displayed on the exposed region 753 may be changed to a preferential icon of the first screen (e.g., an icon of a home screen). In addition, when the user touches the exposed region 753 in a left-and-right direction, the icon displayed on the exposed region 753 may be changed to an icon that is associated with the icon that was displayed prior to the touch. For example, when the user touches the exposed region 753 in the left-and-right direction, the phone directory icon may be changed to an icon that is associated with the phone directory icon, such as a phone call recording icon or a dial icon.

Figure 32:
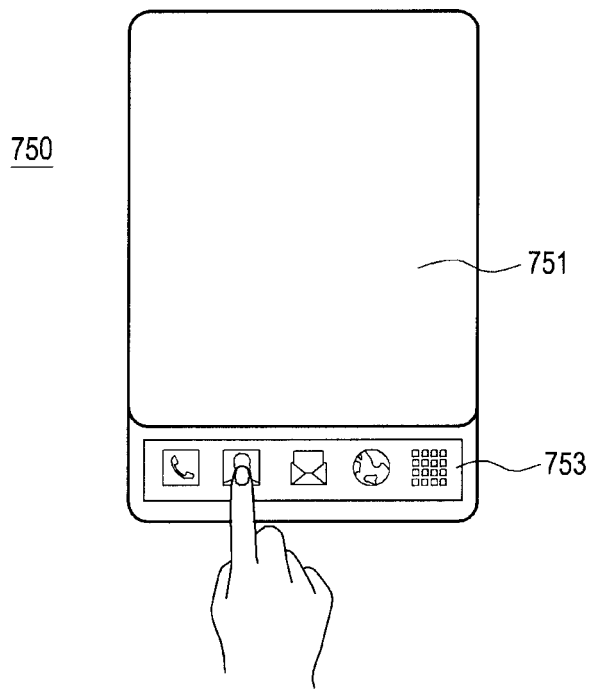
FIG. 32 is a view illustrating an example of using the electronic device according to the thirteenth one of various embodiments of the present disclosure in the folded state.
Figure 33:
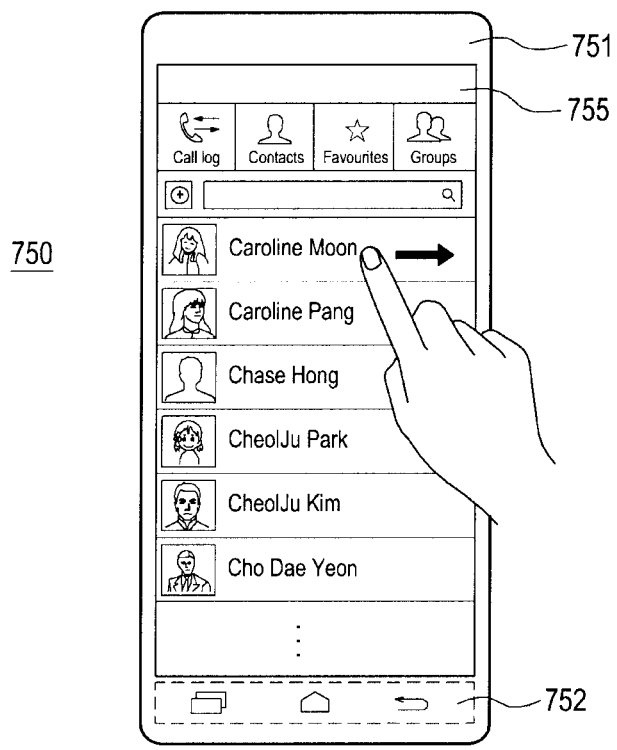
FIG. 33 and FIG. 34 are views for describing a configuration that interlocks the operations before and after the electronic device illustrated in FIG. 31 is unfolded.
Figure 34:
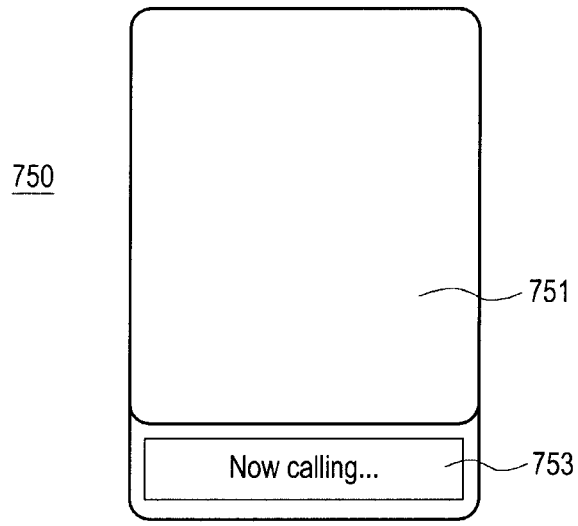

FIG. 32 is a view illustrating an example of using the electronic device according to the thirteenth one of various embodiments of the present disclosure in the folded state. FIGS. 33 and 34 are views for describing a configuration that interlocks the operations before and after the electronic device illustrated in FIG. 31 is unfolded.

Referring to FIG. 32, in the state where a flexible display device 751 is folded, the user may touch the exposed region 753. For example, the user may touch, for example, a phone directory icon. In addition, when the flexible display device 751 is unfolded, a function or a menu or other information that is associated with an icon, which has been displayed on the exposed region 753, may be displayed on the flexible display device 751 to be interlocked with the icon, as illustrated in FIG. 33. For example, when the flexible display device is unfolded after the phone directory icon displayed on the exposed region 753 is touched, names, which are recorded in the phone directory, may be displayed on the flexible display device 751, as illustrated in FIG. 33. In addition, the user may touch the flexible display device 751 so as to activate the icon. For example, the user can make a phone call by touching a name of a counterpart, to whom the user wants to speak.

In addition, the user may fold the electronic device 750 in order to carry the electronic device 750. Referring to FIG. 34, when the user folds the electronic device after having made the phone call, the exposed region 753 is exposed again to the outside of the body 751 so that the electronic device can output an icon that indicates a phone call mode or indicates that it is in a state where the user is speaking.

As described above, according to the thirteenth one of various embodiments of the present disclosure, the electronic device 750 may allow the user to use a function thereof even in the folded state in order to enhance the portability by the user.

Figure 35:
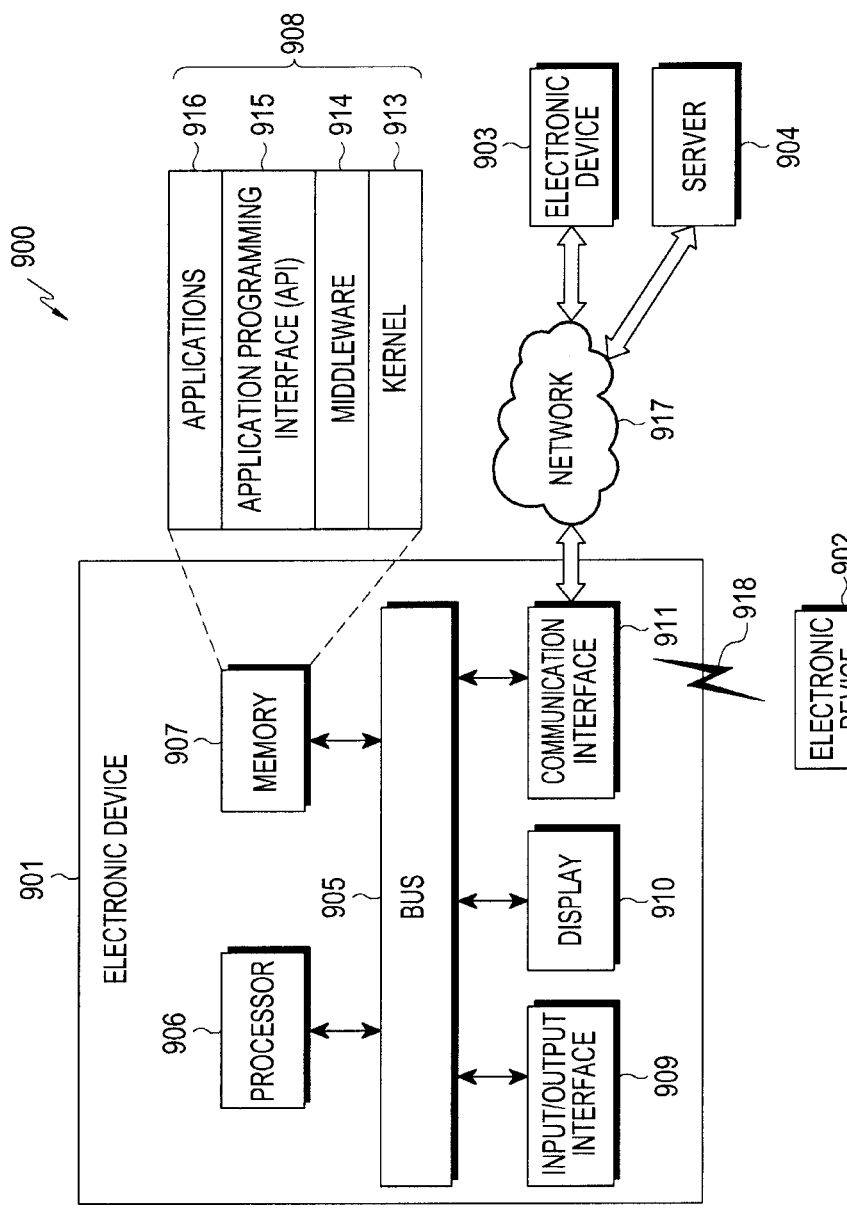
FIG. 35 is a view illustrating a network environment in which an electronic device according to various embodiments of the present disclosure is operated.

FIG. 35 is a view illustrating a network environment in which an electronic device according to various embodiments of the present disclosure is operated.

The electronic device according to various embodiments of the present disclosure may interwork with various electronic devices as described below. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™, a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

Referring to FIG. 35, descriptions will be made on an electronic device 901 within a network environment 900 in various embodiments. The electronic device 901 may include a bus 905, a processor 906, a memory 907, an input/output interface 909, a display 910, and a communication interface 911. In an embodiment, the electronic device 901 may omit at least one of the above-mentioned components or may additionally include other components.

The bus 905 may include, for example, a circuit that connects the above-mentioned components 905 to 911 and transmits communication (e.g., a control message and/or data) between the components, for example, with the components of the electronic device 902, as indicated by lightening bolt 918.

The processor 906 may include one or more of a Central Processing Unit (CPU), an Application Processor (AP), and a Communication Processor (CP). The processor 906 may execute, for example, an arithmetic operation or data processing that is related to a control and/or communication of one or more other components of the electronic device 901.

The memory 907 may include a volatile memory and/or a non-volatile memory. The memory 907 may store, for example, commands or data that are related to one or more other components of the electronic device 901. According to one embodiment, the memory 907 may store software and/or a program 908. The program 908 may include, for example, a kernel 913, a middleware 914, an Application Programming Interface (API) 915, and/or an application program (or an "application") 916. At least one of the kernel 913, the middleware 914, and the API 915 may be referred to as an Operating System (OS).

The kernel 913 may control or manage, for example, system resources (e.g., the bus 905, the processor 906, or the memory 907) that are used for executing operations or functions implemented in the other programs (e.g., the middleware 914, the API 915, or the application programs 916). In addition, the kernel 913 may provide an interface that allows the middleware 914, the API 915, or the application program 916 to access individual components of the electronic device 901 so as to control or manage the system resources.

The middleware 914 may play an intermediary role such that, for example, the API 915 or the application programs 916 may communicate with the kernel 913 so as to exchange data. In addition, in connection with one or more task requests received from the application programs 916, the middleware 914 may perform a control for the task requests (e.g., scheduling or load balancing) by using a method of assigning the priority to be capable of using a system resource of the electronic device 901 (e.g., the bus 905, the processor 906, or the memory 907) to at least one of the application programs 916.

The API 915 is an interface that allows the application 916 to control functions provided from the kernel 913 or the middleware 914 and may include, for example, at least one interface or function (e.g., commands) for a file control, a window control, an image processing, or a character control.

The input/output interface 909 may serve as an interface to transmit commands or data, which are entered from, for example, a user or another external device, to the other component(s) of the electronic device 901. Also, the input/output interface 909 may output commands or data, which are received from the other component(s) of the electronic device 901, to the user or the other external device.

The display 910 may include, for example, a Liquid Crystal Display (LCD), a Light Emitting Diode (LED) display, an Organic Light Emitting Diode (OLED) display, or a MicroElectroMechanical systems (MEMS) display, or an electronic paper display. The display 910 may display various contents (e.g., text, image, video, icon, or symbol) to, for example, the user. The display 910 may include a touch screen, and may receive a touch input, a gesture input, a proximity input, or a hovering input using, for example, an electronic pen or a part of the user's body. The display may be a flexible display device or a second display device according to the above-described embodiments.

The communication interface 911 may set, for example, communication between the electronic device 901 and an external electronic device (e.g., a first external electronic device 902, a second external device 903, and/or a server 904). For example, the communication interface 911 may communicate with the external device (e.g., the second external electronic device 903 or the server 904) by being connected with a network 917 through wired or wireless communication.

The wireless communication may use at least one of, for example, LTE), LTE-A, CDMA, WCDMA, UMTS, WiBro, or GSM. The wired communication may use at least one of, for example, Universal Serial Bus (USB), High Definition Multimedia Interface (HDMI), Recommended Standard 232 (RS-232), and Plain Old Telephone Service (POTS). The network 917 may include a telecommunication network, for example, at least one of a computer network (e.g., LAN or WAN), the internet, and a telephone network.

Each of the first and second external electronic devices 902 and 903 may be a type of device that is the same as or different from the electronic device 901. According to one embodiment, the server 904 may include a group of one or more servers. According to various embodiments, all or some of the operations to be executed by the electronic device 901 may be executed by another electronic device or a plurality of other electronic devices (e.g., the electronic devices 902 and 903 or the server 904). According to one embodiment, in the case where the electronic device 901 should perform a certain function or service automatically or by a request, the electronic device 901 may request some functions or services that are associated therewith from the other electronic devices (e.g., the electronic devices 902 and 903 or the server 904), instead of or in addition to executing the functions or service by itself. The other electronic devices (e.g., the electronic devices 902 and 903 or the server 904) may execute the requested functions or additional functions, and may transmit the results to the electronic device 901. In addition, the electronic device 901 may provide the requested functions or services by processing the received results. For this purpose, for example, a cloud computing technique, a distributed computing technique, or a client-server computing technique may be used.

Figure 36:
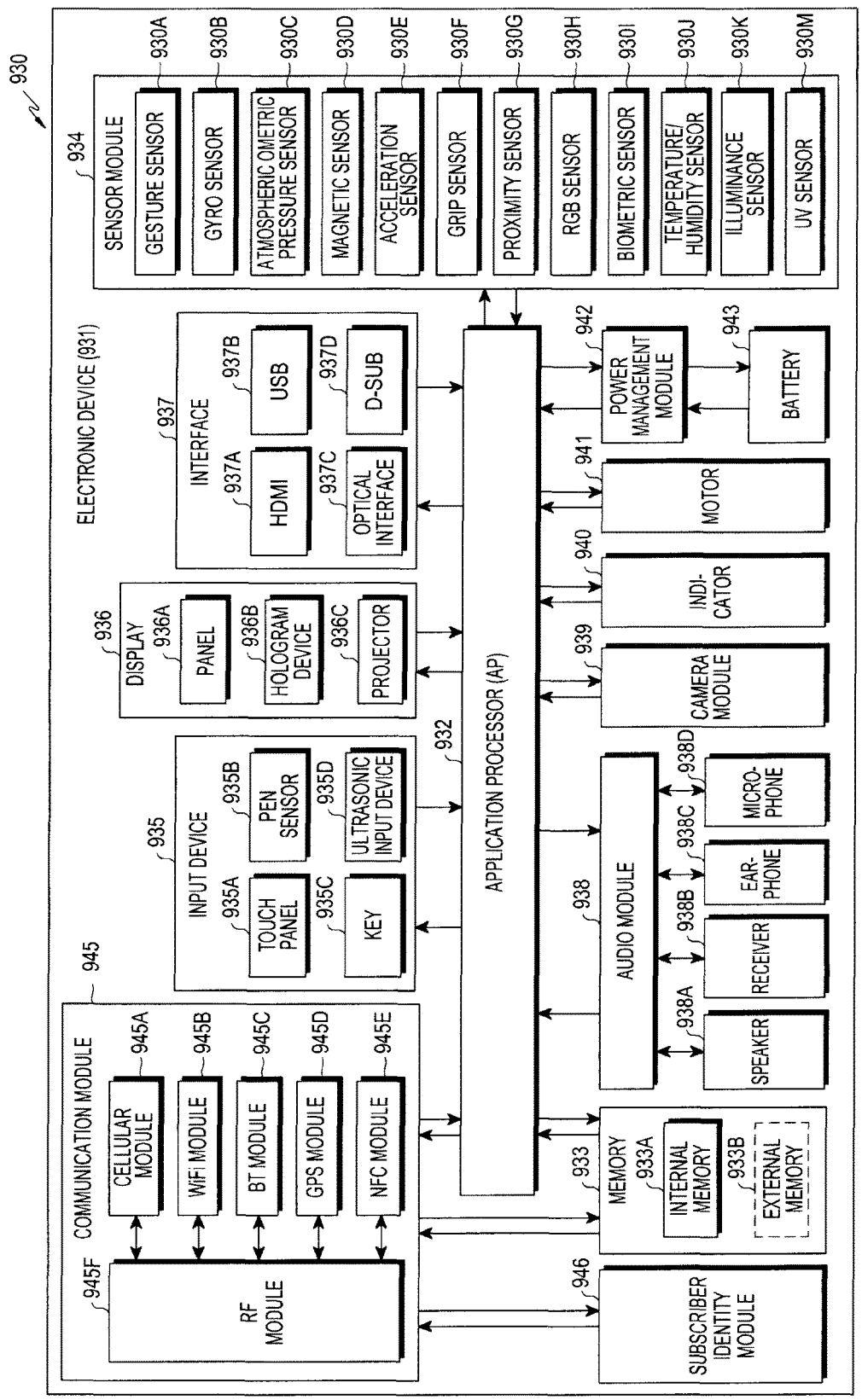
FIG. 36 is a block diagram of an electronic device according to various of the present disclosure.

FIG. 36 is a block diagram 930 of an electronic device 931 according to various embodiments of the present disclosure. The electronic device 931 may include, for example, the entirety or a portion of the electronic device 901 illustrated in FIG. 35. The electronic device 931 may include at least one Application Processor (AP) 932, a communication module 945, a Subscriber Identification Module (SIM) card 946, a memory 933, a sensor module 934, an input device 935, a display 936, an interface 937, an audio module 938, a camera module 939, a power management module 942, a battery 943, an indicator 940, and/or a motor 941.

The AP 932 may drive, for example, an operating system or an application program so as to control a plurality of hardware or software components connected thereto, and may also perform various data processing and arithmetic operations. The AP 932 may be implemented by, for example, a System-on-Chip (SoC). According to one embodiment, the AP 932 may further include a Graphic Processing Unit (GPU) and/or an image signal processor. The AP 932 may include at least some components (e.g., the cellular module 945A) among the components illustrated in FIG. 36. The AP 932 may load and process a command or data received from at least one of the other components (e.g., the non-volatile memory) in a volatile memory, and may store various data in the non-volatile memory.

The communication module 945 may have a configuration that is the same as or similar to the communication interface 170 of FIG. 35. The communication module 945 may include, for example, a cellular module 945A, a WiFi module 945B, a Bluetooth module 945C, a GPS module 945D, an NFC module 945E, and a Radio Frequency (RF) module 945F.

The cellular module 945A may provide, for example, a voice call, a video call, a message service, or an internet service through a communication network. According to one embodiment, the cellular module 945A may perform discrimination and authentication of the electronic device 931 within the communication network by using the subscriber identification module (e.g., a SIM card) 946. According to one embodiment, the cellular module 945A may perform at least some of the multimedia control functions that may be provided by the AP 932. According to one embodiment, the cellular module 945A may include a Communication Processor (CP). The cellular module 945A may be operated through the exposed regions of the above-described embodiments.

Each of the WiFi module 945B, the BT module 945C, the GPS module 945D, and the NFC module 945E may include, for example, a processor to process data transmitted/received through a corresponding module. According to a certain embodiment, at least some (two or more) of the cellular module 945A, the WiFi module 945B, the Bluetooth module 945C, the GPS module 945D, and the NFC module 945E may be incorporated in a single Integrated Chip (IC) or an IC package.

The RF module 945F may transmit/receive a communication signal (e.g., an RF signal). The RF module 945F may include, for example, a transceiver, a Power Amp Module (PAM), a frequency filter, a Low Noise Amplifier (LNA), or an antenna. According to another embodiment, at least one of the cellular module 945A, the WiFi module 945B, the BT module 945C, the GPS module 945D, and the NFC module 945E may transmit/receive an RF signal through a separate RF module.

The SIM card 946 may include, for example, a card that includes a subscriber identification module and/or an embed SIM, and may also include intrinsic identification information (e.g., Integrated Circuit Card IDentifier (ICCID)) or subscriber information (e.g., International Mobile Subscriber Identity (IMSI)).

The memory 933 may include, for example, an internal memory 933A or an external memory 933B. The internal memory 933A may include at least one of, for example, a volatile memory (e.g., Dynamic RAM (DRAM), Static RAM (SRAM), or Synchronous DRAM (SDRAM)), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid State Drive (SSD)).

The external memory 933B may further include a flash drive (e.g., Compact Flash (CF), Secure Digital (SD), Micro Secure Digital (Micro-SD), Mini Secure Digital (Mini-SD), extreme Digital (xD), or memory stick). The external memory 933B may be functionally and/or physically connected to the electronic device 931 through various interfaces.

The sensor module 934 may measure a physical quantity and/or may sense an operating status of the electronic device 931, and may then convert the measured or sensed information into electric signals. The sensor module 934 may include at least one of, for example, a gesture sensor 930A, a gyro sensor 930B, an atmospheric pressure sensor 930C, a magnetic sensor 930D, an acceleration sensor 930E, a grip sensor 930F, a proximity sensor 930G, a color sensor 930H (e.g., RGB (Red, Green, Blue) sensor), a biometric sensor 930I, a temperature/humidity sensor 930J, an illuminance sensor 930K, and a Ultra-Violet (UV) sensor 930M. Additionally or alternatively, the sensor module 934 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 934 may further include a control circuit for controlling one or more sensors incorporated therein. In a certain embodiment, the electronic device 931 may further include a processor configured to control the sensor module 934 as a part of the AP 932 or separate from the AP 932 so as to control the sensor module 934 while the AP 932 is in the sleep state. The magnetic sensor 930D may be provided in the body or the flexible display device that is a constituent element of the above-described embodiments such that there can be a determination as to whether the flexible display device is folded by using the magnetic sensor 930D. However, the sensor that determines whether the flexible display device is folded is not limited to the magnetic sensor 930D.

When it is sensed that the first display device is folded through the magnetic sensor, the AP may switch the first display device into the sleep mode. At the same time, the AP may activate the second display device. However, activating the second display device may be performed based on the user's request (e.g., a touch input that maintains the touch state over a predetermined length of time).

The input device 935 may include a touch panel 935A, a (digital) pen sensor 935B, a key 935C, or an ultrasonic input device 935D. As the touch panel 935A, at least one of, for example, a capacitive type touch panel, a resistive type touch panel, an infrared type touch panel, and an ultrasonic type panel may be used. Also, the touch panel 935A may further include a control circuit. In addition, the touch panel 935A may further include a tactile layer so as to provide a tactile reaction to a user. The input device 935 may be provided in the flexible display device, the second display device, or the exposed region of the above-described embodiments.

The (digital) pen sensor 935B may be, for example, a portion of the touch panel or may include a separate recognition sheet. The key 935C may include, for example, a physical button, an optical key, or a keypad. The ultrasonic input device 935D may sense, through a microphone (e.g., a microphone 938D) in the electronic device 931, ultrasonic waves that are generated by an input tool so that data corresponding to the sensed ultrasonic waves can be confirmed.

The display 936 (e.g., the display 910) may include a panel 936A, a hologram device 936B, or a projector 936C. The panel 936A may include a configuration that is the same as or similar to that of the display 910 of FIG. 35. The panel 936A may be implemented to be flexible, transparent, or wearable. The panel 936A may be configured as a single module with the touch panel 935A. The hologram device 936B may show a stereoscopic image in the air using interference of light. The projector 936C may project light onto a screen so as to display an image. The screen may be located inside or outside the electronic device 931. According to one embodiment, the display 936 may further include a control circuit to control the panel 936A, the hologram device 936B, or the projector 936C.

The interface 937 may include, for example, a High-Definition Multimedia Interface (HDMI) 937A, a Universal Serial Bus (USB) 937B, an optical interface 937C, or a D-subminiature (D-sub) 937D. For example, the interface 937 may be included in the communication interface 910 illustrated in FIG. 35. Additionally or alternatively, the interface 937 may include, for example, a Mobile High-definition Link (MHL) interface, a Secure Digital (SD) card/Multi-Media Card (MMC) interface, or an Infrared Data Association (IrDA) standard interface.

The audio module 938 may bi-directionally convert sound information including, for example, sounds and electric signals. At least some of the components of the audio module 938 may be included in, for example, the input/output interface 908 illustrated in FIG. 35. The audio module 938 may process sound information input or output through, for example, a speaker 938A, a receiver 938B, an earphone 938C, or a microphone 938D.

The camera module 939 is a device that is capable of photographing, for example, a still image and a moving image. According to one embodiment, the camera module 939 may include at least one image sensor (e.g., a front sensor or a rear sensor), a lens, an Image Signal Processor (ISP), or a flash (e.g., LED or xenon lamp).

The power management module 942 may manage, for example, electric power of the electronic device 931. According to one embodiment, the power management module 942 may include a Power Management Integrated Circuit (PMIC), a charger Integrated Circuit (IC), or a battery or fuel gauge. The PMIC may be configured in a wired and/or wireless charge type. The wireless charge type may include, for example, a magnetic resonance type, a magnetic induction type, or an electromagnetic wave type, and may further include an additional circuit for wireless charging, such as a coil loop, a resonance circuit, or a rectifier. The battery gauge may measure the residual amount of the battery 943 and a voltage, a current, or a temperature during the charge. The battery 943 may include, for example, a rechargeable battery and/or a solar battery. In addition, when the flexible display device of the above-described embodiments is folded, the power management module 942 may cut off the power of the flexible display device, except for the exposed region, The indicator 940 may indicate a specific status of the electronic device 931 or of a part thereof (e.g., AP 932), such as a booting status, a message status, or a charged status. The motor 941 may convert an electric signal into a mechanical vibration, and may generate, for example, a vibration or a haptic effect. Although not illustrated, the electronic device 931 may include a processor (e.g., GPU) to support a mobile TV. The processor to support a mobile TV may process media data according to the standards of, for example, Digital Multimedia Broadcasting (DMB), Digital Video Broadcasting (DVB), or media flow.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 37:
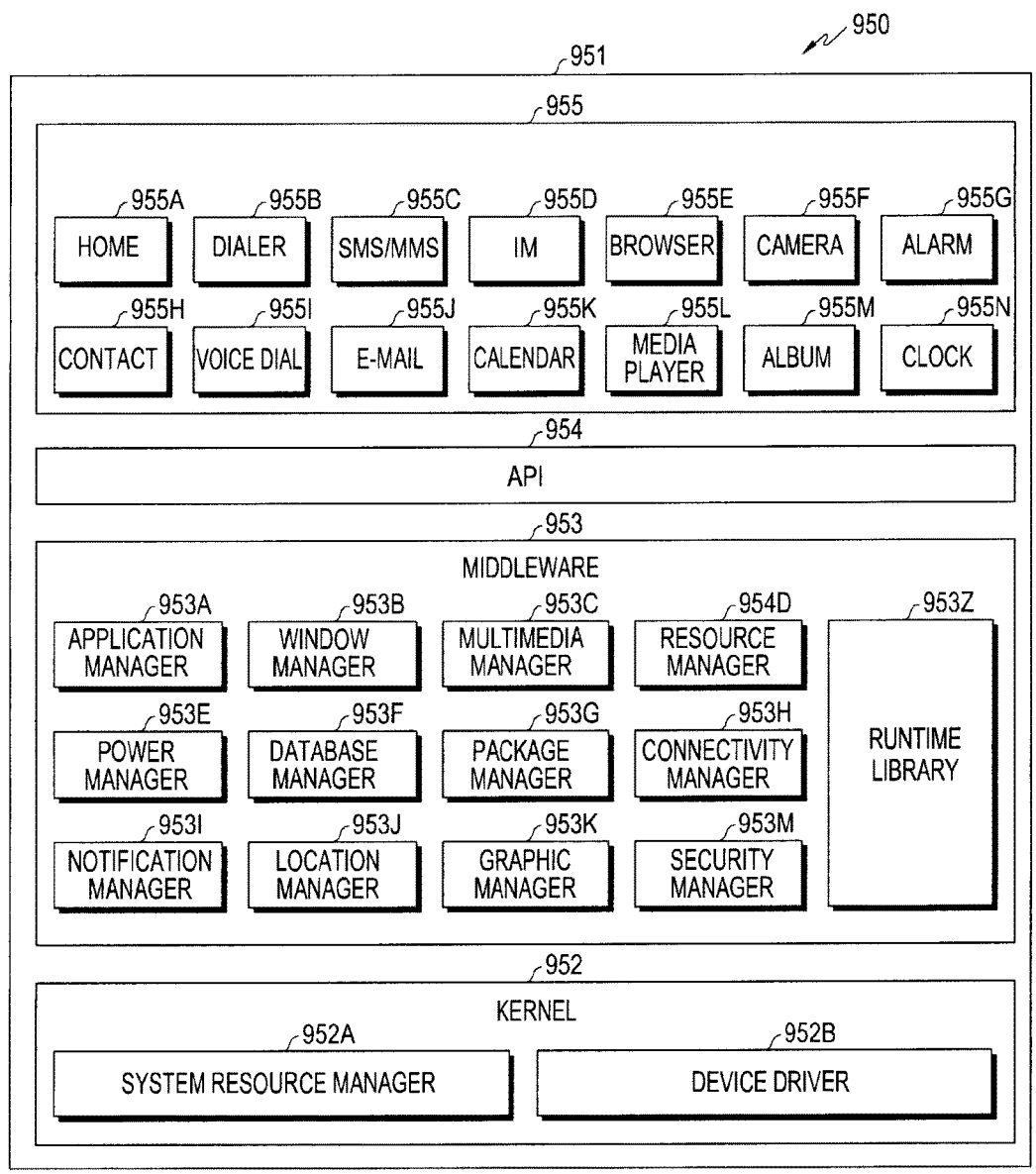
FIG. 37 is a block diagram of a program module according to various embodiments of the present disclosure.

FIG. 37 is a block diagram 950 of a program module 951 according to various embodiments of the present disclosure. According to one embodiment, a program module 951 (e.g., the program 908 in FIG. 35) may include an Operating System (OS) that controls resources associated with an electronic device (e.g., the electronic device 901 in FIG. 35) and/or various applications (e.g., the application programs 916 in FIG. 35) that are driven on the operating system. The operating system may be, for example, Android, iOS, Windows, Symbian, Tizen, Bada, or the like.

The program module 951 may include a kernel 952, a middleware 953, an Application Programming Interface (API) 954, and/or an application 955. At least a part of the program module 951 may be preloaded on the electronic device, or may be downloaded from a server (e.g., the server 904 in FIG. 35).

The kernel 952 (e.g., the kernel 913 in FIG. 35) may include, for example, a system resource manager 952A and/or a device driver 952B. The system resource manager 952A may perform, for example, a control, allocation, or recovery of a system resource. According to one embodiment, the system resource manager 952A may include a process management unit, a memory management unit, a file system management unit, or the like. The device driver 952B may include, for example, a display driver, a camera driver, a Bluetooth driver, a common memory driver, a USB driver, a keypad driver, a WiFi driver, an audio driver, or an Inter-Process Communication (IPC) driver.

The middleware 953 may provide, for example, a function that is commonly required by the applications 955, or may provide various functions to the applications 955 through the API 954 such that the applications 955 can efficiently use the limited system resources within the electronic device. According to one embodiment, the middleware 953 (e.g., the middleware 914) may include at least one of a runtime library 953Z, an application manager 953A, a window manager 953B, a multimedia manager 953C, a resource manager 953D, a power manager 953E, a database manager 953F, a package manager 953G, a connectivity manager 953H, a notification manager 953I, a location manager 953J, a graphic manager 953K, and a security manager 953M.

The runtime library 953Z may include, for example, a library module that is used by a compiler in order to add a new function through a program language while the applications 955 are executed. The runtime library 953Z may perform input/output management, memory management, a function for an arithmetic function, or the like.

The application manager 953A may manage, for example, a life cycle of at least one application among the applications 955. The window manager 953B may manage a graphical user interface (GUI) resource that is used in a screen. The multimedia manager 953C may grasp a format required for reproducing various media files, and may perform encoding or decoding of the media files by using a codec that is suitable for the corresponding format. The resource manager 953D may manage a resource, such as a source code, a memory, a storage space, or the like of at least one application among the applications 955.

The power manager 953E is operated together with, for example, a Basic Input/Output System (BIOS) so as to manage a battery or a power source, and may provide, for example, power information that is required for operating the electronic device. The database manager 953F may generate, retrieve, or change a database to be used by at least one application among the applications 955. The package manager 953G may manage the installation or update of an application that is distributed in the form of a package file.

The connectivity manager 953H may manage, for example, a wireless connection of WiFi or Bluetooth. The notification manager 953I may display or notify events, such as an arrival message, appointment, and proximity notification in a manner that does not disturb the user. The location manager 953J may manage position information of the electronic device. The graphic manager 953K may manage a graphic effect to be provided to the user or a user interface associated therewith. The security manager 953M may provide all security functions required for system security, user authentication, or the like. According to one embodiment, in the case where the electronic device (e.g., the electronic device 901 in FIG. 35) includes a phone function, the middleware 953 may include a telephony manager to manage a voice or video call function of the electronic device.

The middleware 953 may include a middleware module that forms a combination of various functions of the above-described components. The middleware 953 may provide a module that is specialized for each kind of operation system in order to provide differentiated functions. In addition, the middleware 953 may dynamically delete some of the existing components or add new components.

The API 954 (e.g., the API 915 in FIG. 35) is, for example, a collection of API programming functions, and may be provided in different configurations according to operation systems. For example, Android or iOS may provide one API set for each platform and Tizen may provide two or more API sets for each platform.

The applications 955 (e.g., the application programs 916 in FIG. 35) may include, for example, one or more applications that can execute the functions of home 955A, dialer 955B, SMS/MMS 955C, Instant Message (IM) 955D, browser 955E, camera 955F, alarm 955G, contact 955H, voice dial 955I, e-mail 955J, calendar 955K, media player 955L, album 955M, and watch 955N, health care (e.g., measurement of a quantity of motion, blood sugar, or the like), provision of environmental information (e.g., provision of atmospheric pressure, humidity, or temperature information), etc.

According to one embodiment, the applications 955 may include an application that supports information exchange between the electronic device (e.g., the electronic device 901 in FIG. 35) and the external electronic devices (e.g., the electronic devices 902 and 903 in FIG. 35) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 902 and 903 in FIG. 35). In addition, the notification relay application may receive notification information from, for example, an external electronic device, and may provide the notification information to the user. The device management application may manage (e.g., install, delete, or update) at least one function of an external electronic device (e.g., the electronic device 903 in FIG. 35) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to one embodiment, the applications 955 may include an application designated according to an attribute of an external electronic device (e.g., the electronic device 902 or 903 in FIG. 35) (e.g., a healthcare application of a mobile medical device). According to one embodiment, the applications 955 may include an application received from an external electronic device (e.g., the server 904 in FIG. 35 or the electronic device 902 or 903 in FIG. 35). According to one embodiment, the applications 955 may include a preloaded application or a third party application that is capable of being downloaded from the server. Names of the elements of the program module 951, according to the above-described embodiments of the present disclosure, may change depending on the type of operating system (OS).

According to various exemplary embodiments of the present disclosure, at least some of the program module 951 may be implemented in software, firmware, hardware, or a combination of two or more thereof. At least some of the programming module 951 may be implemented (for example, executed) by, for example, the processor (for example, the AP 932). At least one of the programming modules 951 may include, for example, a module, program, routine, sets of instructions, process, or the like for performing one or more functions.

The "module" used in various embodiments of the present disclosure may refer to, for example, a "unit" including one of hardware, software, and firmware, or a combination of two or more of the hardware, software, and firmware. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor (906, FIG. 35)), the one or more processors may execute a function corresponding to the command. The computer-readable storage medium may be, for example, memory (e.g., element 907 as shown in FIG. 35).

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

As described above, according to various embodiments, an electronic device may include: a foldable body; a flexible display device that is provided on a front face of the body to be foldable together with the body; and a cover that is provided to enclose at least a portion of a rear face of the body and to be foldable together with the body. In a state where the body is folded, at least a portion (hereinafter, referred to as an "exposed region") of the body or the flexible display device may be visually exposed to the outside.

In addition, according to various embodiments of the present disclosure, the electronic device may further include a second display device that is provided on the rear face of the body. The second display device may be concealed by the cover when the body is in an unfolded state, and may be exposed to the outside of the cover in a state where the body is in a folded state.

In addition, according to various embodiments of the present disclosure, the second display device may be provided on the rear face of the body.

In addition, according to various embodiments of the present disclosure, the cover may be coupled to the body to be slidable, and one end of the cover and one end of the body may be fixed to each other. The second display device may be provided on another end of the body.

In addition, according to various embodiments of the present disclosure, the cover may be coupled to the body to be slidable, and a central portion of the cover and a central portion of the body may be fixed to each other. The second display device may be provided on each of opposite ends of the body.

In addition, according to various embodiments of the present disclosure, the cover may include a first guide that is formed to protrude toward the body, the body may include a first guide hole that corresponds to the first guide, and the first guide may be moved along the first guide hole.

In addition, according to various embodiments of the present disclosure, the second display device may be set to correspond to a displacement that is proportional to a thickness of the cover.

In addition, according to various embodiments of the present disclosure, the electronic device may further include a sensor that is provided on any one of the body and the cover to sense a sliding extent of at least a portion of the cover on the body.

In addition, according to various embodiments of the present disclosure, the second display device may change a displayed icon according to a user's touch input.

In addition, according to various embodiments of the present disclosure, an electronic device may include: a foldable body transitionable between a folded state and an unfolded state; and a flexible display device that is provided to the body to be foldable together with the body. In the folded state (i.e., where the flexible display device is folded), at least a portion (hereinafter, referred to as an "exposed region") of the flexible display device may be visually exposed to the outside.

In addition, according to various embodiments of the present disclosure, the electronic device may further include a touch key unit that is provided on another end of the body.

In addition, according to various embodiments of the present disclosure, the exposed region may conceal the touch key unit when the foldable body is in the folded state and/or when the flexible display device is in a folded state.

In addition, according to various embodiments of the present disclosure, the touch key unit may include: a touch window member that is arranged on the body; a light emitting member that is provided inside the touch window member; and an insertion groove that is formed between the touch window member and the light emitting member. The insertion groove may accommodate the exposed region in the state where the flexible display device is folded.

In addition, according to various embodiments of the present disclosure, the light emitting member may be turned on/off depending on whether the exposed region is inserted into the insertion groove.

In addition, according to various embodiments of the present disclosure, one end of the body may include a body hole that corresponds to one end of the flexible display device, and the one end of the flexible display device may be slid with respect to the body to be selectively accommodated in the body hole.

In addition, according to various embodiments of the present disclosure, the electronic device may further include: a second guide that extends from the flexible display device and is slid on the body; and a second guide recess that is formed in the body to correspond to the second guide. The second guide may be guided by the second guide recess such that at least a portion of the flexible display device is slid on the body.

In addition, according to various embodiments of the present disclosure, the body may include a first bezel that encloses a side surface of the flexible display device, and a second bezel that is provided at a lower side of the body.

In addition, according to various embodiments of the present disclosure, as the flexible display device is slid, the exposed region may be selectively accommodated in the second bezel.

In addition, according to various embodiments of the present disclosure, the second guide may be slid on the second bezel together with the exposed region.

In addition, according to various embodiments of the present disclosure, the electronic device may further include a sensor that senses a sliding extent of at least a portion of the flexible display device on the body. For example, the sensor can sense the distance by which the flexible display device slides relative to the body.

While the present disclosure has been shown and described with reference to certain embodiments thereof, it will be understood by those skilled in the art that various changes in form and details may be made therein without departing from the spirit and scope of the present disclosure.

What is claimed is:
1. An electronic device comprising:
a foldable body transitionable between an unfolded state and a folded state;
a flexible display device disposed on a front face of the body, the flexible display being foldable together with the body;
a cover that encloses at least a portion of a rear face of the body opposite to the front face of the body, the cover being foldable together with the body; and
a second display device disposed on the rear face of the body and separate from the flexible display device,
wherein the second display device is concealed by the cover when the foldable body is in the unfolded state,
wherein the second display device is disposed in a region of the rear face opposite the front face, such that both the region of the rear face and the second display device are exposed when the foldable body is in the folded state, and
wherein both ends of the flexible display device are arranged to face each other when the foldable body is in the folded state.

2. The electronic device of claim 1, wherein the cover is slidable relative to the body, the cover including a first end, the body including a second end, the first and second ends being fixed to each other.

3. The electronic device of claim 1, wherein the cover is slidable relative to the body, and a central portion of the cover and a central portion of the body are fixed to each other.

4. The electronic device of claim 1, wherein the cover includes a first guide that protrudes toward the body, the body includes a first guide hole corresponding to the first guide, and the first guide is movable along the first guide hole.

5. The electronic device of claim 1, wherein the second display device is configured to have a size that corresponds to a displacement of the cover relative to the flexible display device, the displacement being proportional to a thickness of the cover.

6. The electronic device of claim 1, further comprising:
a sensor that is operatively coupled to at least one of the body and the cover to sense a sliding extent of at least a portion of the cover relative to the body, wherein the sensor is disposed along the rear face of the body interposed between the second display device and a hinge of the foldable body.

7. The electronic device of claim 1, wherein the second display device displays an icon, and wherein the displayed icon is changeable responsive to a user's touch input.

8. The electronic device of claim 1, further comprising:
a touch key unit that is provided on an end of the body.

9. The electronic device of claim 8, wherein the exposed region conceals the touch key unit when the foldable body is in the folded state.

10. The electronic device of claim 8, wherein the touch key unit includes:
a touch window member that is arranged on the body; a light emitting member that is provided inside the touch window member; and
an insertion groove that is formed between the touch window member and the light emitting member,
wherein the insertion groove accommodates the exposed region when the flexible display device is in the folded state.

11. The electronic device of claim 10, wherein the light emitting member is one of turned on and off in response to the exposed region being inserted into the insertion groove.

12. The electronic device of claim 8, wherein one end of the body includes a body hole configured to receive an end of the flexible display device, the one end of the flexible display device being slidable with respect to the body to be selectively accommodated in the body hole.

13. The electronic device of claim 1, further comprising:
a guide extending from the flexible display device and being slidable with respect to the body; and
a guide recess that is formed in the body to correspond to the guide,
wherein the guide is guided by the guide recess such that at least a portion of the flexible display device is slid on the body.

14. The electronic device of claim 13, wherein the body includes:
a first bezel enclosing a side surface of the flexible display device; and
a second bezel that is provided at a lower side of the body.

15. The electronic device of claim 14, wherein, when the flexible display device is slid, the exposed region is selectively accommodated in the second bezel.

16. The electronic device of claim 15, wherein the guide is configured to slide on the second bezel together with the exposed region.

17. The electronic device of claim 1, further comprising:
a sensor configured to sense a sliding extent of at least a portion of the flexible display device.

* * * * *